United States Patent
Fujine et al.

(10) Patent No.: US 9,350,961 B2
(45) Date of Patent: *May 24, 2016

(54) VIDEO DISPLAY DEVICE AND TELEVISION RECEIVING DEVICE

(75) Inventors: Toshiyuki Fujine, Osaka (JP); Yoji Shiraya, Osaka (JP)

(73) Assignee: Sharp Kabushiki Kaisha, Osaka-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/373,367

(22) PCT Filed: Jul. 19, 2012

(86) PCT No.: PCT/JP2012/068271
§ 371 (c)(1),
(2), (4) Date: Jul. 21, 2014

(87) PCT Pub. No.: WO2013/114645
PCT Pub. Date: Aug. 8, 2013

(65) Prior Publication Data
US 2015/0009418 A1    Jan. 8, 2015

(30) Foreign Application Priority Data

Feb. 3, 2012   (JP) ................................. 2012-021442

(51) Int. Cl.
*H04N 9/64*    (2006.01)
*G09G 3/34*    (2006.01)
(Continued)

(52) U.S. Cl.
CPC ............. *H04N 9/646* (2013.01); *G09G 3/2092* (2013.01); *G09G 3/3406* (2013.01);
(Continued)

(58) Field of Classification Search
CPC ..... H04N 9/30; G09G 3/3426; G09G 3/3406; G09G 3/2092; G09G 2320/0233; G09G 2320/0271; G09G 2320/0613; G09G 2320/062; G09G 2320/064; G09G 2320/0646; G09G 2320/0653; G09G 2320/066
See application file for complete search history.

(56) References Cited

U.S. PATENT DOCUMENTS 5,841,486 A * 11/1998 Ando ........................ H04N 5/57
                                                            348/565
5,969,767 A * 10/1999 Ishikawa ................... H04N 5/45
                                                            348/564

(Continued)

FOREIGN PATENT DOCUMENTS

CN    101379545 A    3/2009
CN    101933078 A    12/2010

(Continued)

*Primary Examiner* — Brian Yenke
(74) *Attorney, Agent, or Firm* — Birch, Stewart, Kolasch & Birch, LLP

(57) ABSTRACT

The present invention makes possible video expressions with increased feeling of brightness and increased contrast feeling and to be able to prevent the feeling of brightness and the contrast feeling from becoming unnatural during execution of the multi-screen display. This video display device comprises: a control portion (a signal processing portion (1); an area-active-control/luminance-stretch-portion (4)) that controls a displaying portion (8) and a backlight portion (6); and a display instruction detection portion (13a) that detects display instructions of first and second input video signals. The control portion stretches and increases the luminance of the backlight portion (6), and also controls a light emitting portion enhancement processing according to a result of the detection. In the light emitting portion enhancement processing, the display luminance of a light emitting portion is enhanced by producing a histogram by integrating number of pixels for a predetermined feature amount relating to the brightness of the input video signal, detecting an upper region of a predetermined range of the histogram as the light emitting portion, and reducing luminance of a video signal of non-light emitting portion except the light emitting portion of the input video signal.

14 Claims, 15 Drawing Sheets

(51) Int. Cl.
*H04N 9/30* (2006.01)
*G09G 3/20* (2006.01)

(52) U.S. Cl.
CPC .............. *G09G 3/3426* (2013.01); *H04N 9/30* (2013.01); *G09G 2320/0271* (2013.01); *G09G 2320/062* (2013.01); *G09G 2320/064* (2013.01); *G09G 2320/066* (2013.01); *G09G 2320/0646* (2013.01); *G09G 2320/0653* (2013.01); *G09G 2360/16* (2013.01)

(56) References Cited

U.S. PATENT DOCUMENTS

| | | | | | |
|---|---|---|---|---|---|
| 6,067,126 | A * | 5/2000 | Alexander | ........... | G11B 27/034 348/722 |
| 6,188,439 | B1 * | 2/2001 | Kim | ........... | H04N 5/60 348/478 |
| 6,263,502 | B1 * | 7/2001 | Morrison | ........... | H04N 5/44 348/563 |
| 6,481,011 | B1 * | 11/2002 | Lemmons | ........... | H04N 5/44543 348/E5.105 |
| 6,556,253 | B1 * | 4/2003 | Megied | ........... | G09G 1/002 348/565 |
| 6,771,319 | B2 * | 8/2004 | Konuma | ........... | H04N 3/32 348/584 |
| 6,809,776 | B1 * | 10/2004 | Simpson | ........... | H04N 5/445 348/565 |
| 7,034,895 | B2 * | 4/2006 | Okunuki | ........... | G09G 3/3406 348/673 |
| 7,145,569 | B2 * | 12/2006 | Yamamoto | ........... | A63F 13/10 345/581 |
| 7,522,218 | B2 * | 4/2009 | Lyu | ........... | H04N 5/445 348/468 |
| 7,643,095 | B2 * | 1/2010 | Yoshii | ........... | G09G 3/3406 348/554 |
| 7,982,810 | B2 * | 7/2011 | Ohara | ........... | H04N 5/44504 348/563 |
| 8,456,578 | B2 * | 6/2013 | Tada | ........... | H04N 5/202 348/383 |
| 8,896,758 | B2 * | 11/2014 | Funatsu | ........... | G09G 3/20 345/690 |
| 8,964,124 | B2 * | 2/2015 | Fujine | ........... | G09G 3/3406 345/102 |
| 2002/0130830 | A1 * | 9/2002 | Park | ........... | G09G 3/3406 345/99 |
| 2003/0103164 | A1 * | 6/2003 | Numata | ........... | H04N 7/012 348/448 |
| 2004/0257318 | A1 * | 12/2004 | Itoh | ........... | G09G 3/3406 345/87 |
| 2005/0162564 | A1 * | 7/2005 | Sakaguchi | ........... | H04N 5/20 348/687 |
| 2006/0256240 | A1 * | 11/2006 | Oka | ........... | H04N 5/20 348/630 |
| 2006/0268180 | A1 * | 11/2006 | Chou | ........... | G06T 5/009 348/673 |
| 2007/0269132 | A1 * | 11/2007 | Duan | ........... | G06T 5/007 382/274 |
| 2008/0016532 | A1 * | 1/2008 | Wang | ........... | H04N 5/4401 725/45 |
| 2009/0146941 | A1 | 6/2009 | Fujine et al. | | |
| 2010/0053222 | A1 * | 3/2010 | Kerofsky | ........... | G09G 3/3406 345/690 |
| 2010/0278423 | A1 | 11/2010 | Itoh et al. | | |
| 2010/0328535 | A1 * | 12/2010 | Okui | ........... | G09G 3/20 348/578 |
| 2011/0025728 | A1 | 2/2011 | Baba et al. | | |
| 2011/0164050 | A1 * | 7/2011 | Adachi | ........... | G09G 3/3406 345/589 |
| 2014/0009513 | A1 | 1/2014 | Noutoshi et al. | | |

FOREIGN PATENT DOCUMENTS

| | | |
|---|---|---|
| JP | 2002-55664 A | 2/2002 |
| JP | 2007-140483 A | 6/2007 |
| JP | 2007-241250 A | 9/2007 |
| JP | 2009-63694 A | 3/2009 |
| JP | 2010-130399 A | 6/2010 |
| JP | 4991949 B1 | 8/2012 |

* cited by examiner

FIG.3
(A)
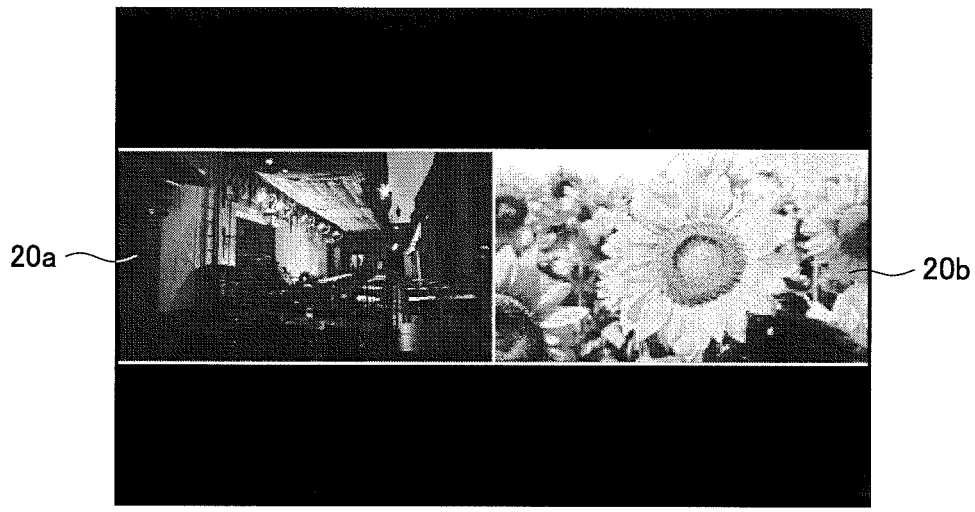
(B)
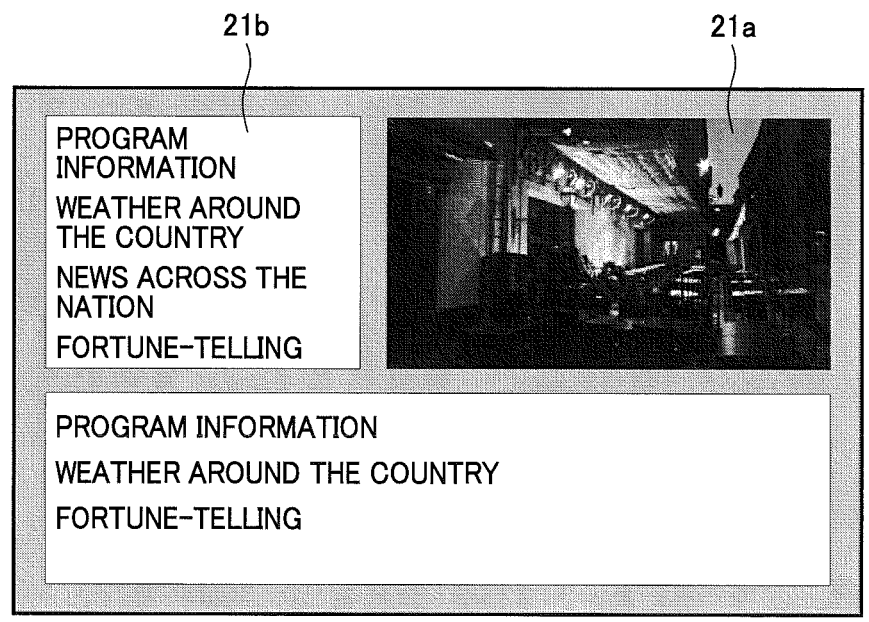

FIG.4
(A)
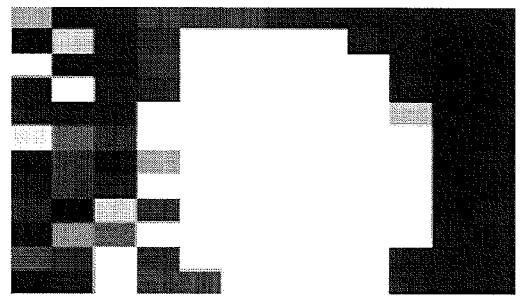
(B)
(C)
(D)

| 0 | 128 | 8 |
|---|---|---|
| 16 | 32 | 64 |
| 96 | 96 | 0 |

(B)

BACKLIGHT LIGHTING RATE
21.7%

(C)

| 0 | 255 | 16 |
|---|---|---|
| 32 | 64 | 128 |
| 192 | 192 | 0 |

VIDEO DISPLAY DEVICE AND TELEVISION RECEIVING DEVICE

TECHNICAL FIELD

The present invention relate to a video display device and a television receiving device, and more particularly, to a video display device and a television receiving device that each include an enhancement function to improve the image quality of the displayed video.

BACKGROUND OF THE INVENTION

For a liquid crystal display apparatus including a liquid crystal panel that modulates the light source light according to a video signal, and a backlight light source to illuminate the liquid crystal panel, a technique is known according to which the quality level of the displayed video is improved by controlling the light emission luminance of the backlight light source corresponding to an input video signal.

For example, Patent Document 1 discloses a liquid crystal display apparatus that calculates the average picture level (hereinafter, referred to as "APL") in one frame as a feature amount of an input video signal and adjusts the light emission luminance of the backlight light source corresponding to the APL.

However, when the light emission luminance is adjusted simply corresponding to the APL, for multi-screen display displaying both of a dark video and a bright video, the light emission luminance becomes the one that corresponds to an intermediate APL between the APL of the dark video and the APL of the bright video, and therefore, the feeling of brightness and the contrast feeling become unnatural.

For two-screen display displaying a video for a personal computer and a television video, when the light emission luminance control for the backlight light source of the overall two screens is executed corresponding to the APL of the television video, the light emission luminance is properly controlled for the screen displaying the television video while the light emission luminance is improper for the screen displaying the video for the personal computer, and the feeling of brightness and the contrast feeling thereof are unnatural.

Therefore, Patent Document 1 discloses a liquid crystal display apparatus that adjusts the light emission luminance of the backlight light, source corresponding to the APL but that discontinues the process of adjusting the light emission luminance corresponding to the APL of the input video signal when the multi-screen display is executed.

Patent Document 2 discloses an image display apparatus that, for executing two-screen display, properly improves the visual contrast feeling avoiding any uncomfortable feeling from both of the screens by correcting the amplitude of the video signal such that contrast adjustment and light source luminance adjustment are executed for the screen to be controlled and the effect of the light source luminance adjustment is cancelled for the screen not to be controlled.

PRIOR ART DOCUMENT

Patent Documents

Patent Document 1: Japanese Laid-Open Patent Publication No. 2007-241250
Patent Document 2: Japanese Laid-Open Patent Publication No. 2002-55664

SUMMARY OF THE INVENTION

Problem to be Solved by the Invention

According to the traditional technique of Patent Document 1, the APL of one frame is calculated and the light emission luminance of the backlight light source is adjusted corresponding to the APL. However, a problem arises that a high contrast and high quality video may not be always acquired when the adjustment of the light emission luminance is uniformly executed for various videos based only on the APL.

According to the traditional technique of Patent Document 2, the amplitude of the video signal for the screen not to be controlled is corrected depending on the light source luminance adjustment for the screen to be controlled. Therefore, similarly to the traditional technique of Patent Document 1, a problem arises that a high contrast and high quality video may not be always acquired for the screen not to be controlled.

In the case where the display luminance is enhanced for a variously varying video, when the display luminance of a light emitting portion is consciously enhanced by increasing the luminance of the light source by stretching the luminance, detecting a portion relatively brightly shining (a light emitting portion) from the luminance distribution of the video, and reducing the luminance of the video signal of a non-light emitting portion except the light emitting portion, the human eyes visually recognize the contrast feeling to be improved and the feeling of brightness to be increased. Therefore, an effect is achieved that a displayed video at a high quality level can be provided, whose light emitting portion on the screen is further made distinct and whose image quality is thereby improved. However, it is difficult to acquire such an effect only by simply using the APL.

The present invention was conceived in view of the above circumstances and an object thereof is to provide a video display device and a television receiving device each configured to enable video expression with increased feeling of brightness and increased contrast feeling and to be able to prevent the feeling of brightness and the contrast feeling from becoming unnatural during execution of the multi-screen display, by enhancing the display luminance of the light emitting portion to be distinctly displayed by: increasing the luminance of the light source by stretching the luminance; detecting the light emitting portion of the video from the video signal; and reducing the luminance of the video signal of the non-light emitting portion except the light emitting portion.

Means for Solving the Problem

To solve the above problems, a first technical means of the present invention is a video display device comprising a displaying portion that displays an input video signal, a light source that illuminates the displaying portion, and a control portion that controls the displaying portion and the light source, the video display device further comprising a display instruction detecting portion that detects whether an instruction is issued to display on the displaying portion a second input video signal together with a first input video signal as the input video signal, wherein the control portion controls a light emitting portion enhancement processing for enhancing display luminance of a light emitting portion of the input video signal by increasing luminance of the light source by stretching the luminance based on the input video signal, detecting a light emitting portion regarded as a light emitting video based on a predetermined feature amount relating to brightness of the input video signal, and reducing luminance of a video signal of a non-light emitting portion except the light emitting portion of the input video signal, and switches the control of the light emitting portion enhancement processing according to a result of the detection by the display instruction detecting portion, and wherein the control portion divides an image by the input video signal into a plurality of areas, varies a lighting rate of an area of the light source corresponding to a divided area that is an area acquired by the division, based on a gray level value of a video signal of the divided area, acquires an average lighting rate for a plurality of areas of the light source by averaging the lighting rates of the areas of the light source, and stretches the luminance of the light source based on a maximal display luminance capable of being taken on a screen of the displaying portion correlated in advance with the average lighting rate.

A second technical means is the video display device of the first technical means, wherein when issuance is detected of an instruction to display the second input video signal together with the first input video signal, the control portion discontinues the light emitting portion enhancement processing.

A third technical means is the video display device of the first technical means, wherein when issuance is detected of an instruction to display the second input video signal together with the first input video signal, the control portion executes the light emitting portion enhancement processing for the first input video signal based on a setting of a first control property and executes the light emitting portion enhancement processing for the second input video signal based on a setting of a second control property.

A fourth technical means is the video display device of the third technical means, further comprising a genre detecting portion that detects a first video genre of the first input video signal and a second video genre of the second input video signal, wherein the setting of the first control property is determined based on the first video genre and the setting of the second control property is determined based on the second video genre.

A fifth technical means is the video display device of the first technical means, wherein the control portion produces a histogram by integrating number of pixels for the predetermined feature amount, and when representing an average value of the histogram as "A" and the standard deviation thereof as "σ", the control portion detects $$\text{thresh} = A + N\sigma (N \text{ is a constant})$$

or more pixels to be the light emitting portion.

A sixth technical means is the video display device of the first technical means, wherein the control portion reduces an amount of increase of the display luminance of the displaying portion by the luminance stretching of the light source in the non-light emitting portion by reducing the luminance of the input video signal.

A seventh technical means is a television receiving device comprising the video display device of the first technical means.

An eighth technical means is a video display device comprising a displaying portion that displays an input video signal, a light source that illuminates the displaying portion, and a control portion that controls the displaying portion and the light source, the video display device further comprising: a display instruction detecting portion that detects whether an instruction is issued to display on the displaying portion a second input video signal together with a first input video signal as the input video signal, wherein the control portion controls a light emitting portion enhancement processing for enhancing display luminance of a light emitting portion of the input video signal by increasing luminance of the light source by stretching the luminance based on the input video signal, detecting a light emitting portion regarded as a light emitting video based on a predetermined feature amount relating to brightness of the input video signal, and reducing luminance of a video signal of a non-light emitting portion except the light emitting portion of the input video signal, and switches the control of the light emitting portion enhancement processing according to a result of the detection by the display instruction detecting portion, and wherein the control portion calculates a score indicating a degree of brightness by counting number of pixels with weighting brightness of each pixel for a video in a predetermined range including an area of the detected light emitting portion, and stretches the luminance of the light source according to the score.

A ninth technical means is the video display device of the eighth technical means, wherein when issuance is detected of an instruction to display the second input video signal together with the first input video signal, the control portion discontinues the light emitting portion enhancement processing.

A tenth technical means is the video display device of the eighth technical means, wherein when issuance is detected of an instruction to display the second input video signal together with the first input video signal, the control portion executes the light emitting portion enhancement processing for the first input video signal based on a setting of a first control property and executes the light emitting portion enhancement processing for the second input video signal based on a setting of a second control property.

An eleventh technical means is the video display device of the tenth technical means, further comprising a genre detecting portion that detects a first video genre of the first input video signal and a second video genre of the second input video signal, wherein the setting of the first control property is determined based on the first video genre and the setting of the second control property is determined based on the second video genre.

A twelfth technical means is the video display device of the eighth technical means, wherein the control portion produces a histogram by integrating number of pixels for the redetermined feature amount, and when representing an average value of the histogram as "A" and the standard deviation thereof as "σ", the control portion detects $$\text{thresh} = A + N\sigma (N \text{ is a constant})$$

or more pixels to be the light emitting portion.

A thirteenth technical means is the video display device of the eighth technical means, wherein the control portion reduces an amount of increase of the display luminance of the displaying portion by the luminance stretching of the light source in the non-light emitting portion by reducing the luminance of the input video signal.

A fourteenth technical means is a television receiving device comprising the video display device of the eighth technical means.

Effect of the Invention

According to the video display device of the present invention, the display luminance of the light emitting portion is enhanced (a light emitting portion enhancement processing) to be distinctly displayed by increasing the luminance of the light source by stretching the luminance based on the input video signal; detecting the light emitting portion of the video from the video signal; and reducing the luminance of the video signal of the non-light emitting portion except the light emitting portion. Thereby, the video expression is enabled whose feeling of brightness and contrast feeling are increased. It is detected whether any instruction is issued to display on the display portion the second input video signal together with the first input video signal, and the control of the light emitting portion enhancement processing is switched according to the result of the detection. Therefore, for example, when the multi-screen display is executed, the feeling of brightness and the contrast feeling can be prevented from becoming unnatural by discontinuing the light emitting portion enhancement processing, etc.

BRIEF DESCRIPTION OF DRAWINGS

FIG. 3 is a diagram of examples of two-screen display executed by the video display device of FIG. 1.

FIG. 4 is a diagram for explaining an exemplary process of calculating an average lighting rate executed by the area-active-control/luminance-stretching portion of the video display device of FIG. 1.

FIG. 5 is a diagram for explaining the average lighting rate of a backlight and a gray level value of a pixel of FIG. 4.

PREFERRED EMBODIMENT OF TEE INVENTION

First Embodiment

Figure 1:
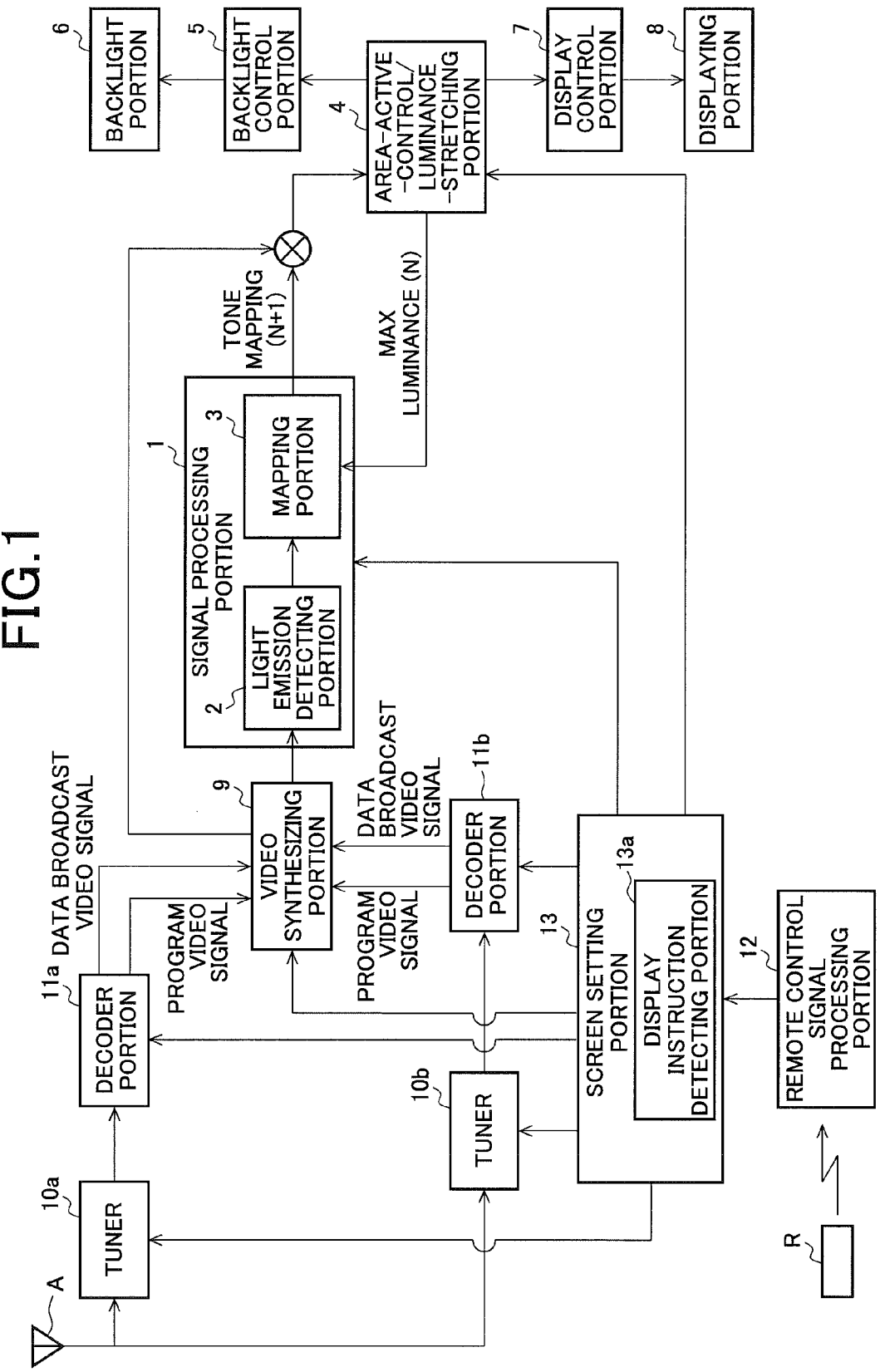
FIG. 1 is a diagram for explaining an embodiment of a video display device according to the present invention and depicts an exemplary configuration of the purview of the video display device.

FIG. 1 is a diagram for explaining an embodiment of a video display device according to the present invention and depicts an exemplary configuration of the purview of the video display device. The video display device displays a video acquired by applying image processing to an input video signal, and for example, the video display device constitutes, for example, a television receiving device.

The video display device exemplified in FIG. 1 includes a signal processing portion 1, an area-active-control/luminance-stretching portion 4, a backlight control portion 5, a backlight portion 6, a display control portion 7, a displaying portion 8, a video synthesizing portion 9, tuners 10a and 10b, decoder portions 11a and 11b, a remote control signal processing portion 12, and an image setting portion 13.

The signal processing portion 1 includes a light emission detecting portion 2 and a mapping portion 3. The image setting portion 13 includes a display instruction detecting portion 13a. The control portion of the present invention controls the backlight portion 6 and the displaying portion 8, and examples of the control portion can be the signal processing portion the area-active-control/luminance-stretching portion 4, the backlight control portion and the display control portion 7.

The tuners 10a and 10b receive a broadcast signal designated by a user, of the broadcast signals received by an antenna A, and output the received broadcast signal to the decoder portions 11a and 11b. The video display device can switch between one-screen display that displays only the video signal of one program, and two-screen display that displays the video signals (a first input, video signal and a second input video signal) of two programs. Only the one tuner 10a is used for the one-screen display, and the two tuners 10a and 10b are used for the two-screen display.

The video display device can execute the data broadcast display that displays the video signal of the data broadcast (the second input video signal) together with the video signal of the program (the first video signal), and in this case, only the one tuner 10a is used.

The decoder portions 11a and 11b decode a broadcast signal input by the tuners 10a and 10b, extract the video signal of the program, the video signal of the data broadcast, etc., from the broadcast signal, and output the extracted video signal to the video synthesizing portion 9.

The remote control signal processing portion 12 includes a remote control light receiving portion not depicted, analyzes a remote control signal received from a remote control R, and acquires: information indicating whether the two-screen display displaying video signals of two programs is executed; information indicating whether the two-screen display displaying the video signal of a program and the video signal of the data broadcast is executed; information on the received program designated by the user; etc. The remote control signal processing portion 12 outputs the acquired pieces of information to the screen setting portion 13.

The screen setting portion 13 includes a display instruction detecting portion 13a. The display instruction detecting portion 13a receives from the remote control signal processing portion 12 information indicating execution of the two-screen display to display video signals of two programs, and thereby, detects that the user issues an instruction to display the video signals of the two programs.

When the screen setting portion 13 detects the issuance of the instruction, the screen setting portion 13 causes both of the tuners 10a and 10b to function, and instructs the decoder portions 11a and 11b to output the video signals of the programs to the video synthesizing portion 9. The screen setting portion 13 outputs a signal indicating that the two-screen display is executed, to the signal processing portion 1 and the area-active-control/luminance-stretching portion 4.

The display instruction detecting portion 13a receives from the remote control signal processing portion 12 the information indicating the execution of the two-screen display to display the video signal of a program and the video signal of data broadcast, and thereby, detects that the user issues the instruction to display the video signal of the program and the video signal of the data broadcast.

When the screen setting portion 13 detects the issuance of the instruction, the screen setting portion 13 causes only the tuner 10a to function and instructs the decoder portion 11a to output to the video synthesizing portion 9 the video signal of the program and the video signal of the data broadcast. The screen setting portion 13 outputs the signal indicating the execution of the two-screen display to the signal processing portion 1 and the area-active-control/luminance-stretching portion 4.

When no instruction is issued to display the video signals of the two programs or when no instruction is issued to display the video signal of the program and the video signal of the data broadcast, the screen setting portion 13 causes only the tuner 10a to function and instructs the decoder portion 11a to output the video signal of the program to the video synthesizing portion 9. The screen setting portion 13 outputs a signal indicating the execution of the one-screen display to display only the video signal of the one program to the signal processing portion 1 and the area-active-control/luminance-stretching portion 4.

When the two-screen display is executed to display the video signals of the two programs, the video synthesizing portion 9 synthesizes the video signals of the two programs output by the decoder portions 11e and 11b with each other, and outputs the video signal acquired as the result of the synthesis to the area-active-control/luminance-stretching portion 4.

When the two-screen display is executed to display the video signal of the program and the video signal of the data broadcast, the video synthesizing portion 9 synthesizes the video signal of the program and the video signal of the data broadcast output by the decoder portion 11a with each other, and outputs the video signal acquired as the result of the synthesis to the area-active-control/luminance-stretching portion 4.

When the one-screen display is executed to display the video signal of the one program, the video synthesizing portion 9 outputs the video signal of the program output by the decoder portion 11a to the area-active-control/luminance-stretching portion 4 without synthesizing the video signal with any other signal.

When the one-screen display is executed, the video signal of the program output by the decoder portion 11a is applied with tone mapping based on the information on the tone mapping produced by the mapping portion 3 of the signal processing portion 1, and thereafter, is input, into the area-active-control/luminance-stretching portion 4.

The area-active-control/luminance-stretching portion 4 divides an image based on the video signal into predetermined areas according to the video signal input thereinto, extracts the maximal gray level value of the video signal for each of the divided areas, and calculates the lighting rate of the backlight portion 6 based on the extracted value. The lighting rate is determined for each areas of the backlight portion 6 corresponding to the divided areas of the video, and the value of the "lighting rate" used herein is varied in practice as described later, and therefore, can be said to be a tentative value.

The backlight portion 6 is an example of the light source to illuminate the displaying portion 8 and includes plural LEDs, and the luminance is controllable for each area thereof. The lighting rate of each area of the backlight portion 6 is determined based on a computation equation determined, in advance. However, in a high-gray level and bright area having the maximal gray level value, the luminance of the LEDs is basically not reduced and is maintained, and for a low-gray level and dark area having the maximal gray level value, computation is executed causing the luminance of the LEDs to decrease.

The lighting rate may be calculated from another feature amount relating to the brightness of the input video signal such as the average gray level value instead of the maximal gray level value. When the lighting rate is calculated from the average gray level value, in a high-gray level and bright area having the average gray level value, the luminance of the LEDs only has to be not reduced and be maintained, and in a low-gray level and dark area having the average gray level value, computation only has to be executed such as that causing the luminance of the LEDs to decrease.

The area-active-control/luminance-stretching portion 4 calculates the average lighting rate of the overall backlight portion 6 from the lighting rate of each area, and calculates the stretch amount of the maximal light emission luminance of the backlight portion 6 (hereinafter, referred to as "luminance stretch amount") using a predetermined computation equation, according to the average lighting rate. Stretching the maximal light emission luminance of the backlight portion 6 (the maximal light emission luminance of the LEDs) by the luminance stretch amount enables stretching of the maximal screen luminance capable of being taken in all the areas on the screen, by a predetermined amount from reference luminance. The reference luminance to be the original luminance of the stretching is the luminance with which the screen luminance is 550 (cd/m$^2$) for, for example, the maximal gray level value. The reference luminance is not limited to this example and may properly be determined.

Figure 2:
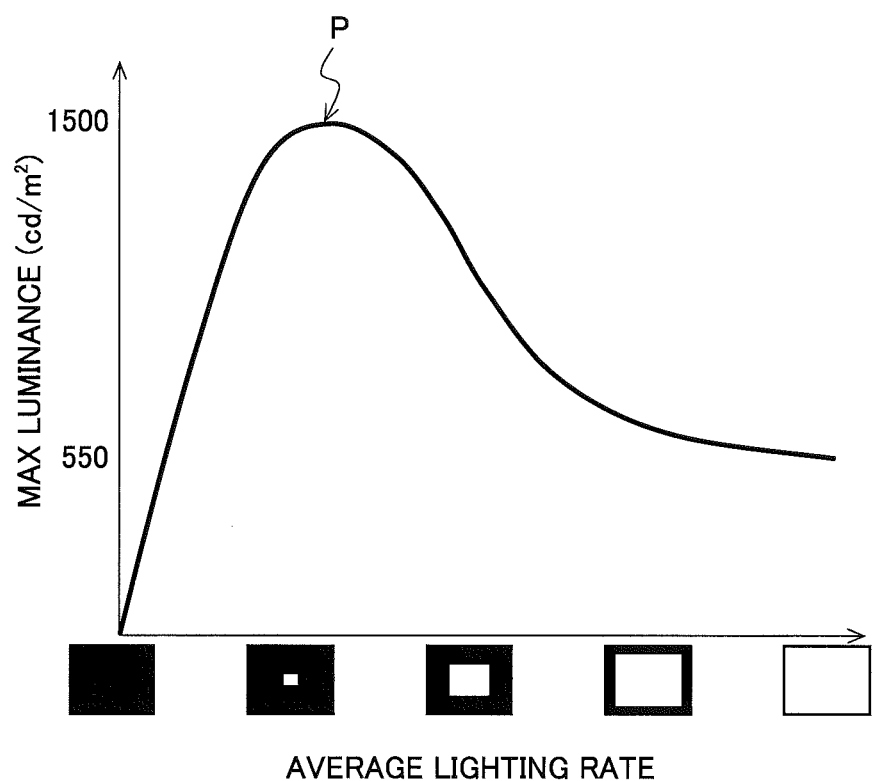
FIG. 2 is a diagram for explaining an exemplary processing by an area-active-control/luminance-stretching portion of the video display device of FIG. 1.

The maximal screen luminance capable of being taken in all the areas on the screen after the stretching, for the maximal gray level value will be referred to as "Max luminance". As above, the luminance, stretch amount is the value determined based on the average lighting rate, and the Max luminance is the value determined based on the luminance stretch amount. Therefore, as exemplified using a graph of FIG. 2, the Max luminance can be said to be the value determined corresponding to the average lighting rate. FIG. 2 is a diagram for explaining an exemplary processing executed by the area-active-control/luminance-stretching portion 4, and depicts an example of a graph showing the relation of the Max luminance (cd/m$^2$) with the average lighting rate of the backlight portion 6 (a window size).

In the graph of FIG. 2, in an area at a low average lighting rate, the Max luminance is lower than the reference luminance (that is 550 cd/m² in this example). This indicates that the luminance stretch amount is negative. As in this example, even when the luminance stretch amount is negative depending on the average lighting rate, an integral value acquired by integrating the graph of the Max luminance of FIG. 2 over all the average lighting rates is greater than the integral value acquired by integrating the reference luminance over all the average lighting rates. Therefore, it can be said that, as a whole, the maximal light emission luminance and the maximal screen luminance (that is, the maximal display luminance) are enhanced by the "stretching".

The area-active-control/luminance-stretching portion 4 varies the lighting rate (a tentative lighting rate) for each area such that the maximal light emission luminance is stretched by the luminance stretch amount calculated corresponding to the average lighting rate. The above series of control steps for the lighting rate for each divided area is referred to as "area active control", that includes the calculation of the lighting rate for each divided area and the varying of the lighting rate corresponding to the average lighting rate (calculation of the lighting rate after the stretching).

As above, preferably: the image based on the input video signal is divided into plural areas; the lighting rate of the area of the light source corresponding to the divided area is varied based on the gray level value of the video signal of the divided area; the average lighting rate is acquired that averages the lighting rates of the areas of the light source for all the areas of the light source; and the luminance of the light source is stretched based on the maximal display luminance (the Max luminance) capable of being taken on the screen of the displaying portion 8 correlated in advance with the acquired average lighting rate. Therefore, the area-active-control/luminance-stretching portion 4 outputs the Max luminance determined corresponding to the average lighting rate for the feedback, to the mapping portion 3 of the signal processing portion 1.

When the one-screen display is executed, the light emission detecting portion 2 of the signal processing portion 1 produces a histogram acquired by integrating the pixel values for each frame based on a predetermined feature amount relating to the brightness of the video signal of the program output by the video synthesizing portion 9, and detects the light emitting portion using the histogram. The light emitting portion is acquired based on the average, value and the standard deviation of the histogram and is detected as a relative value for each histogram. The light emission detecting portion 2 produces a histogram acquired by integrating the pixel values for the predetermined feature amount relating to the brightness of the video signal and detects the upper region of a predetermined range of the histogram as a light emitting portion. This process will be described later in detail.

Describing a (N+1)th frame $f_{N+1}$ of the video signal, the mapping portion 3 produces information on the tone mapping for the frame $f_{N+1}$ using information on the light emitting portion detected for the frame $f_{N+1}$ by the light emission detecting portion 2 and the Max luminance of the N-th frame $f_N$ output from the area-active-control/luminance-stretching portion 4, and outputs the information to a multiplier to apply the information to the frame $_{N+1}$ of the video signal.

The information on the tone mapping is produced such that the luminance, is reduced that corresponds to the amount of the luminance stretch of the backlight portion 6 for the portion regarded as emitting no light in the frame $f_{N+1}$ (a non-light emitting portion). The multiplier is the one to apply the tone mapping to the video signal, multiplies each pixel value of the video signal of the frame $f_{N+1}$ by a gain factor indicated by the tone mapping for the frame $fN_{+1}$, and outputs the video signal acquired as the result to the area-active-control/luminance-stretching portion 4.

The area-active-control/luminance-stretching portion 4 outputs control data to control the backlight portion 6 to the backlight control portion 5. The backlight control portion 5 controls the light emission luminance of the LEDs of the backlight portion 6 for each divided area based on the data. The control data is the data for controlling the backlight portion 6 to have, the lighting rate after the stretching of each area as above.

The control data for the backlight portion 6 for causing the frame $f_{N+1}$ of the video signal to be displayed can be acquired by calculating the lighting rate for each area of the backlight portion 6 based on the computing equation determined in advance, for the video signal of the frame $f_{N+1}$ to which the tone mapping is applied acquired by feeding back the Max luminance of the frame $f_N$, and thereafter, varying the lighting rate by the stretching. The luminance of the LEDs of the backlight portion 6 is executed using pulse width modulation (PWM) control while the value of the luminance can be controlled to a desired value by current control or a combination of these types of control.

The area-active-control/luminance-stretching portion 4 outputs to the display control portion 7 display control data to control the displaying portion 8, and the display control portion 7 controls the display of the displaying portion 8 based on the display control data. The display control data used in causing the frame $f_{N+1}$ of the video signal to be displayed is the data to control the displaying portion 8 such that, for the video signal acquired after applying to the frame $f_{N+1}$ the tone mapping acquired by feeding back the Max luminance of the frame $f_N$, the video represented by the video signal is displayed. A liquid crystal panel is used as the displaying portion 8, that displays an image by being illuminated by the LEDs of the backlight portion 6.

As above, the area-active-control/luminance-stretching portion 4 increases the luminance of the LEDs of the backlight portion 6 by stretching the backlight luminance corresponding to the average lighting rate, returns the information on the luminance stretch (the Max luminance) to the signal processing portion 1, and reduces the luminance that corresponds to the luminance stretch amount of the backlight portion 6 for the video signal. The luminance stretching is executed for the overall backlight portion 6, and the luminance reduction due to the video signal processing occurs in the portion regarded as emitting no light (the non-light emitting portion) except the light emitting portion.

The area-active-control/luminance-stretching portion 4 enhances the display luminance of the light emitting portion using the process of increasing the luminance of the LEDs of the backlight portion 6 by stretching the backlight luminance, and causing the luminance, of the non-light emitting portion to decrease of the video signal (hereinafter, referred to as "light emitting portion enhancement processing"). The screen luminance of only the portion emitting light can be increased and the video expression can be executed with high contrast by using the video signal processing and the backlight luminance control processing.

In the processing for reducing the luminance of the non-light emitting portion of the video signal, the reduction of the luminance corresponding to the luminance stretch amount by the backlight portion 6 for the non-light emitting portion is preferred for maintaining to an extent the screen luminance of the non-light emitting portion. Preferably, in the non-light emitting portion (that is, a predetermined area having a small predetermined feature amount), the area-active-control/luminance-stretching portion 4 reduces the amount of the increase of the display luminance of the displaying portion 8 caused by the stretching of the luminance of the light source, using the reduction of the luminance of the video signal.

The primary object of the present invention is to enable preventing the feeling of brightness and the contrast feeling from becoming unnatural when the multi-screen display is executed increasing the feeling of brightness and the contrast feeling by executing the light emitting portion enhancement processing for the input video signal. The video display device includes, as the configuration directed to the object: the display instruction detecting portion 13a; and the examples of the control portion of the present invention, the signal processing portion 1, the area-active-control/luminance-stretching portion 4, the backlight control portion 5, and the display control portion 7.

As above, the display instruction detecting portion 13a detects whether the user issues an instruction to execute the two-screen display to display the video signals of two programs or whether the user issues an instruction to execute the two-screen display to display the video signal of the program and the video signal of the data broadcast. The signal processing portion 1 and the area-active-control/luminance-stretching portion 4 execute the light emitting portion enhancement processing when no issuance is detected of the instruction to execute the two-screen display, and discontinue the light emitting portion enhancement processing when the issuance is detected of the instruction to execute the above.

As above, in the light emitting portion enhancement processing, the luminance of the light source is increased by stretching the luminance; the histogram is produced by integrating the number of pixels for the predetermined feature amount relating to the brightness of the input video signal; the upper region of the predetermined range of the histogram is detected as the light emitting portion; the luminance of the video signal of the non-light emitting portion is reduced except the light emitting portion of the input video signal; and thereby, the display luminance of the light emitting portion is enhanced.

FIG. 3 is a diagram of examples of the two-screen display executed by the video display device. (A) of FIG. 3 depicts videos 20a and 20b of two programs. The video 20a is a dark video and the video 20b is a bright video. Assuming that the above light emitting portion enhancement processing is executed for this two-screen display, the light emitting portion enhancement processing is executed using the average lighting rate acquired by averaging the lighting rate of the dark video 20a and the lighting rate of the bright video 20b. Therefore, no light emission luminance may not be set that is suitable for each of the videos 20a and 20b. The signal processing portion 1 and the area-active-control/luminance-stretching portion 4 discontinue the light emitting portion enhancement processing when display instruction detecting portion 13a detects that the user issues the instruction to display the video signals of the two programs.

(B) of FIG. 3 depicts a video 21a of the program and a video 21b of the data broadcast. When this two-screen display is executed, the user gazes the characters. Therefore, when the light emitting portion enhancement processing is executed, and as a result, a portion of the video 21b of the data broadcast becomes excessively bright, the image quality is degraded and the user feels dazzled. To prevent this, the signal processing portion 1 and the area-active-control/luminance-stretching portion 4 discontinue the light emitting portion enhancement processing when the display instruction detecting portion 13a detects that the user issues an instruction to display the video signal of the program and the video signal of the data broadcast.

When the light emitting portion enhancement processing is discontinued, the signal processing portion 1 causes the processing of the light emission detecting portion 2 to discontinue and the mapping portion 3 outputs, for example, the tone mapping with its default setting (such as a tone curve whose input and output correspond to each other at ratios of 1:1, as an example) to the multiplier. The area-active-control/luminance-stretching portion 4: discontinues processing concerning the area active control and the luminance stretching; outputs to the backlight control portion 5 the control data to control the backlight portion 6 for the input video signal; and also outputs to the display control portion 7 the display control data to control the displaying portion 8. For example, pieces of data each with its default setting can be used as the control data and the display control data.

According to the area active control, the video is divided into predetermined plural areas (areas) and the light emission luminance of the LEDs is controlled for each of the divided areas. However, even when the light emitting portion enhancement processing is discontinued, the area active control may be executed. For example, as depicted in (C) of FIG. 4 described later, the maximal gray level value of the video signal is extracted for each divided area and the lighting rate of the LEDs (a driving duty) is determined for each area corresponding to the extracted maximal gray level value. In this case, no luminance stretching is executed, and therefore, the processing for stretching the backlight luminance corresponding to the Max luminance acquired from the average lighting rate is discontinued. Associated with this, the processing for feeding back the information on the luminance stretching (the Max luminance) from the area-active-control/luminance-stretching portion 4 to the signal processing portion 1 is also discontinued.

An exemplary process of each portion in this embodiment that includes the above configuration will be described below in more detail.

FIG. 4 is a diagram for explaining an exemplary process of calculating an average lighting rate by the area-active-control/luminance-stretching portion 4, and FIG. 5 is a diagram for explaining the average lighting rate of the backlight and the gray level value of the pixel of FIG. 4.

According to the area active control applied to the embodiment of the present invention, the video is divided into predetermined plural areas (areas) and the light emission luminance of the LEDs corresponding to the divided area is controlled for each area. In the embodiment, the area-active-control/luminance-stretching portion 4 divides the video of one frame into the plural areas (the above areas) determined in advance based on the input video signal, and controls the light emission luminance of the LEDs corresponding to the divided area for each divided area.

The area-active-control/luminance-stretching portion 4 divides the video exemplified in (A) of FIG. 4 into 144 areas acquired by dividing the video area of the overall screen into 12 in the longitudinal direction and into 12 in the transverse direction as depicted in (B) of FIG. 4. It is assumed that at least one LED is disposed in each area as the backlight portion 6.

The area-active-control/luminance-stretching portion 4 extracts the maximal gray level value of the video signal for each area, and determines the tentative lighting rate of the LEDs of each area corresponding to the extracted maximal gray level value. As above, another feature amount concerning the brightness such as the average gray level value of the video signal may be used instead of the maximal gray level value. A statistical value is used as this feature amount. The description will be made taking an example where the maximal gray level value is extracted. In (B) of FIG. 4, the LED lighting rate is depicted using a gray scale for each area. For example, in a high-gray level and bright portion having therein fireworks of the video of (A) of FIG. 4, the brightness is increased by increasing the lighting rate as depicted in (B) of FIG. 4. The process executed in this case will more specifically be described.

(C) of FIG. 4 depicts an example of the state where the maximal gray level value is extracted from each divided area of one frame and the lighting rate corresponding to the maximal gray level value. (D) of FIG. 4 depicts the lighting rate of each area and the average lighting rate of the overall screen. In (C) and (D) of FIG. 4, for simplicity of the description, an example is taken where the screen of one frame is divided into eight areas (areas No. 1 to 8). However, the processing can also be executed after dividing the screen into more areas as in (B) of FIG. 4, and the processing can be executed after dividing the screen into areas of the number equal to the number of disposed LEDs at a maximum.

For each of the areas No. 1 to 8, a tentative LED lighting rate of the backlight of the area is calculated from the maximal gray level value in the area. The tentative lighting rate can be represented by, for example, the driving duty of the LED (hereinafter, referred to as "LED duty"). In this case, the maximal value of the lighting rate is 100%. As above, the luminance of the LED is controlled to become the desired value by the PWM and/or the current control. However, in the description below, for simplicity of the description, an example will be taken where only the PWM control is employed. When the duty exceeds 100% in the PWM control due to the stretch process described later, the current control can be employed.

In determining the LED tentative lighting rate for each area, the luminance of the backlight is reduced by reducing the lighting rate for each dark area whose maximal gray level value is low. The actual lighting rate of each area is determined such that the gray level desired to be displayed is accurately displayed and the LED duty is reduced as low as possible. The LED duty in each area is desired to be reduced as low as possible while the gray level desired to be displayed needs to accurately be displayed without causing this gray level to be unclear, etc. Therefore, the LED duty is set that enables the maximal gray level in the area to be displayed and that reduces the LED duty as low as possible (the tentative lighting rate), and the gray level of the displaying portion 8 (in this case, the LCD panel) is set based on the set LED duty.

The case as an example will be described, where the gray level value of the video is represented by eight-bit data of 0 to 255 and where the gray level values of plural pixels in one area of (C) of FIG. 4 are depicted in (A) of FIG. 5. Of the pixels depicted in (A) of FIG. 5, the maximal gray level value is 123, and in this case, as depicted in (B) of FIG. 5, the lighting rate of the backlight in this area is reduced to $(1/(255/128))^{2.2}$=0.217-fold (21.7%). The area-active-control/luminance-stretching portion 4 only has to determine the tentative lighting rate in this manner, and only has to calculate the gray level value for each area in the displaying portion 8 taking into consideration the tentative lighting rate for the area including the pixel. For example, when the gray level value desired to be displayed is 96, 96/(128/255)=192, and therefore, the pixel only has to be represented using the gray level value of 192. (C) of FIG. 5 depicts the result of the similar calculation of the gray level value used when this gray level value is displayed for each pixel of (A) of FIG. 5.

The luminance stretching is executed in the present invention based on the average lighting rate acquired from the tentative lighting rate, and therefore, the actual lighting rate is not 21.7% as it is in the above case. However, the amount of the luminance stretching (correctly, the amount of the luminance stretching in the previous frame) is already reflected in the tone mapping by the mapping portion 3 and the result thereof is the gray level value desired to be displayed (exemplified by "96"). Therefore, the display control portion 7 only has to control the display of the displaying portion 8 using the display control data of the gray level value depicted in (C) of FIG. 5 for the pixels depicted in (A) of FIG. 5.

In the example of (C) of FIG. 4, the lighting rate of the backlight is determined in a range from 10 to 90% as represented by the percentage for the maximal gray level value of each area represented by the gray scale. (D) of FIG. 4 depicts a graph acquired by arranging the percentages of (C) of FIG. 4 by area. The lighting rate calculation method represents an example thereof, and the tentative lighting rate of each area is calculated according to the computation equation determined in advance such that, basically, the backlight luminance is not reduced for the bright and high-gray level area and the backlight luminance is reduced for the low-gray level and dark area.

The area-active-control/luminance-stretching portion 4 averages the backlight tentative lighting rates for the area calculated from the maximal gray level value of the video signal, lighting and calculates the average lighting rate of the backlight portion 6 in one frame. The calculated average lighting rate of the overall screen is naturally increased when the areas whose lighting rates are high are increased of the areas. In this example, the average lighting rate is at the level depicted by a solid line in (D) of FIG. 4 and the actual value thereof is about 53%.

The actual luminance of the backlight portion 6 is enhanced by stretching the tentative lighting rate of each area based on the value, of the maximal light emission luminance capable of being acquired that is determined corresponding to the average lighting rate (the maximal light emission luminance corresponding to the Max luminance), that is, based on the luminance stretch amount.

The Max luminance is the maximal value of the screen luminance capable of being taken, and is determined based, for example, on the relation as in FIG. 2. The axis of abscissa of the graph of FIG. 2 represents the average lighting rate of the backlight (the window size) while the average lighting rate can be represented as the ratio of the turned-on areas (the window area) whose lighting rate is 100% to the turned-off areas whose lighting rate is 0%. When no turned-on area is present, the average lighting rate is zero. The average lighting rate is increased as the window of the turned-on areas becomes larger. The average lighting rate is 100% when all the areas are turned on.

In FIG. 2, it is assumed that the Max luminance is, for example, 550 (cd/m$^2$) when the backlight is fully turned on (the average lighting rate is 100%), and this Max luminance is used as the reference luminance before the stretching. In this embodiment, the Max luminance is increased as the average lighting rate is reduced from 100%. For eight-bit representation, the screen luminance of the pixel whose gray level value is a gray level of 255 is the highest in the screen, and is the maximal screen luminance capable of being taken (the Max luminance). From this, it can be seen that the screen luminance cannot be increased up to the Max luminance depending on the gray level value of the pixel even for the equal average lighting rate.

In FIG. 2, the value of the Max luminance becomes maximal when the average lighting rate is "P", and the maximal screen luminance in this case is 1,500 (cd/m$^2$). The maximal screen luminance capable of being taken for P is stretched up to 1,500 (cd/m$^2$) compared to 550 (cd/m$^2$) for the fully turned on case. P is set to be a position whose average lighting rate is relatively low. The backlight luminance is stretched up to 1,500 (cd/m$^2$) at the maximum for a wholly dark screen whose average, lighting rate is low and that has a high-gray level peak in a portion thereof.

The reason why the degree of the stretching of the backlight luminance, becomes lower as the average lighting rate becomes higher is that the degree of the stretching tends to be suppressed because an originally bright screen may rather cause a viewer to feel dazzled when the backlight luminance thereof is excessively increased.

The range within which the average lighting rate is low corresponds to a video of a dark screen, and it is more preferred to, in contrast, improve the contrast by suppressing the backlight luminance and maintain the display quality level by suppressing any misadjusted black level than to increase the screen luminance by stretching the backlight luminance. Therefore, in the example of FIG. 2, a setting is employed to suppress the misadjusted black level for the low average lighting rate and the value of the Max luminance is gradually reduced from the average lighting rate of P to the average lighting rate of zero (blackout).

The area-active-control/luminance-stretching portion 4 stretches the backlight luminance according to a curve of FIG. 2 and outputs its control signal to the backlight control portion 5. In this embodiment, as above, the average lighting rate is varied according to the maximal gray level value detected for each divided area of the video and the state of the luminance stretch is varied according to the average lighting rate.

The video signal input into the area-active-control/luminance-stretching portion 4 is applied with the tone mapping using the information on the tone mapping produced by the signal processing by the signal processing portion 1 described below, and the gain of the to gray level area is reduced. Thereby, in the non-light emitting area at a low gray level, the luminance is reduced by the reduction of the gain of the video signal by the amount corresponding to the amount of the stretched back light luminance. As a result, the screen luminance is enhanced only in the light emitting area and the feeling of brightness is increased.

The area-active-control/luminance-stretching portion 4 outputs the value of the Max luminance acquired from the average lighting rate of the backlight according to the curve of FIG. 2, to the mapping portion 3 of the signal processing portion 1. The mapping portion 3 executes the tone mapping using the Max luminance output from the area-active-control/luminance-stretching portion 4.

The signal processing portion 1 will be described.

Figure 6:
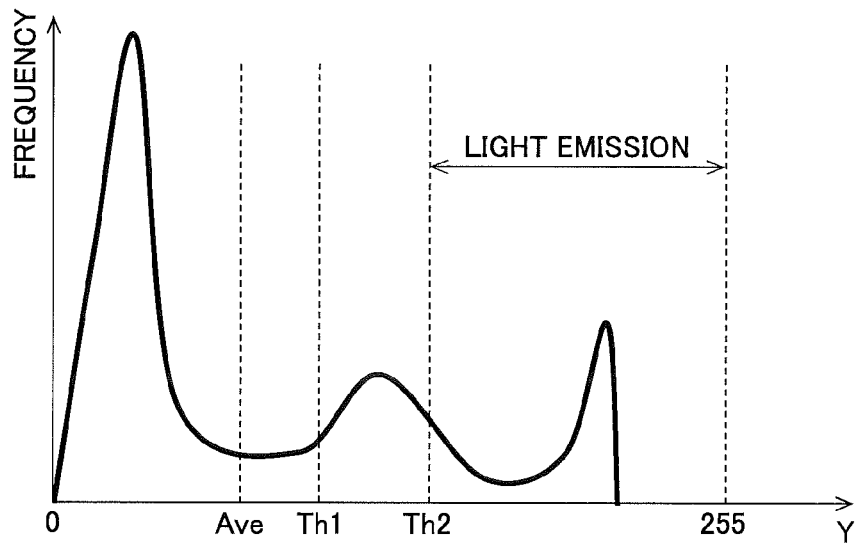
FIG. 6 is a diagram of an example of a Y-histogram produced from a luminance signal Y of an input video signal.

The light emission detecting portion 2 of the signal processing portion 1 detects a light emitting portion from the video signal. FIG. 6 is a diagram of an example of a Y-histogram produced from a luminance signal Y of the input video signal. The light emission detecting portion 2 produces the Y-histogram by integrating the number of pixels for eat luminance gray level of each frame of the input video signal. The axis of abscissa thereof represents the gray level value of the luminance Y and the axis of ordinate represents the number of pixels (frequency) integrated for each gray level value. It is assumed in this embodiment that the light emitting portion for the luminance Y is detected. The luminance Y is an example of the feature amount of the video for producing the histogram to detect the light emitting portion, and other examples of the feature amount will be described later.

When the Y-histogram is produced, the average value (Ave) and the standard deviation ($\sigma$) are calculated from the Y-histogram and two threshold values Th are calculated using these. The second threshold value Th2 determines a light emission boundary, and the pixels whose gray level value is equal to or higher than the threshold value Th2 in the Y-histogram are each regarded as emitting light, and the processing is executed accordingly. The second threshold value Th2 can be expressed by Eq. (1) below using "N" representing a predetermined constant and "$\sigma$" representing the standard deviation. The light emission detecting portion 2 detects the pixels whose gray level values are each equal to or higher than Th2 of Eq. (1) below, as the light emitting portion.

$$Th2 = Ave + N\sigma \qquad \text{Eq. (1)}$$

The first threshold value Th1 is set to suppress the uncomfortable feeling such as that for she gray level property of the area whose gray level value is lower than Th2, and can be expressed by Eq. (2) below using "M" as a predetermined constant satisfying M<N.

$$Th1 = Ave + M\sigma \qquad \text{Eq. (2)}$$

The values of the first and the second threshold values Th1 and Th2 detected by the light emission detecting portion 2 are output to the mapping portion 3 and are used in producing the tone mapping.

Figure 7:
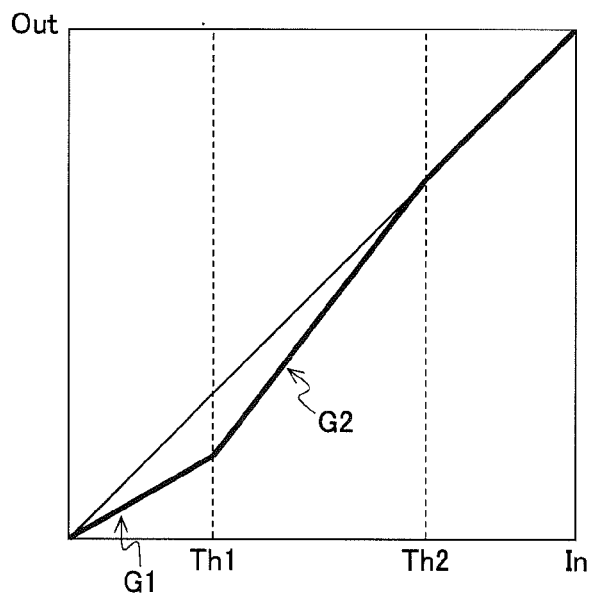
FIG. 7 is a diagram of an example of tone mapping produced by a mapping portion of the video display device of FIG. 1.

FIG. 7 is a diagram of an example of the tone mapping produced by the mapping portion 3. In FIG. 7, the axis of abscissa represents the input gray level of the luminance value of the video and the axis of ordinate represents the output gray level. The pixels whose gray level values each are equal to or higher than the second threshold value Th2 detected by the light emission detecting portion 2 are the light emitting portion in the video, and a compression gain is applied to an area except the light emitting portion to reduce the gain. In this case, when the output gray level is suppressed by applying the constant compression gain uniformly to the area whose gray level value is lower than Th2 that is the light emission boundary, uncomfortable feeling is generated against the gray level property. Therefore, the light emission detecting portion 2 sets the first threshold value Th1 and executes the detection, sets a first gain G1 for the area whose gray level value is lower than Th1, and sets a second gain G2 to linearly connect. Th1 to Th2. Thereafter, the tone mapping is executed.

The method of setting the gains will be described.

The mapping portion 3 is input with the value of the Max luminance from the area-active-control/luminance-stretching portion 4. As above, the Max luminance represents the maximal screen luminance determined from the backlight average lighting rate. The value of the backlight duty (the LED duty) indicating the maximal light emission luminance corresponding to the value of the Max luminance can be used as the value of the Max luminance.

The first gain G1 is applied to the area whose gray level value is lower than the first threshold value Th1 and is set according to Eq. (3) below.

$$G1 = (Ls/Lm)^{1/\gamma} \qquad \text{Eq. (3)}$$

In the above, "Ls" is the reference luminance (the reference luminance acquired when the backlight luminance is not stretched: the luminance, acquired when the maximal screen luminance is 550 cd/m$^2$ as an example) and "Lm" is the Max luminance output from the area-active-control/luminance-stretching portion 4. Therefore, the first gain G1 applied to the area whose gray level value is lower than the first threshold value Th1 reduces the output gray level of the video signal such that the screen luminance is reduced by the amount corresponding to that increased by the backlight luminance stretching.

The tone mapping equal to or higher than the second threshold value Th2 is expressed as f(x)=x. The input gray level is set to be "the input gray level=the output gray level" and processing for reducing the output gray level is not executed. A section between the first threshold value Th1 to the second threshold value Th2 is set to connect using a straight line the output gray level of the first threshold value Th1 reduced by the first gain G1 to the output gray level of the first threshold value Th1. The gain G2 is determined according to G2=(Th2−G1·Th1)/(Th2−Th1).

The tone mapping as depicted in FIG. 7 is acquired by the above process. In this case, preferably, for the connecting section between Th1 and Th2, a predetermined range thereof (for example, the connecting section±Δ (Δ is a predetermined value)) is smoothed using a quadratic function.

The tone mapping produced by the mapping portion 3 is applied to the video signal output by the video synthesizing portion 9, and a video signal whose output of its low gray level portion is suppressed based on the backlight luminance stretch amount, is input into the area-active-control/luminance-stretching portion 4.

Figure 8:
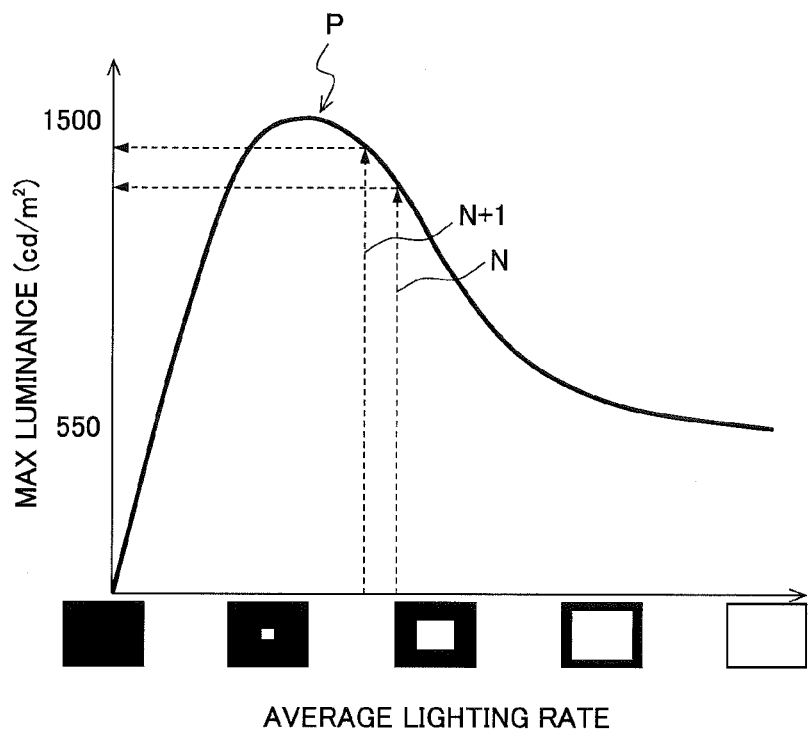
FIG. 8 is a diagram for explaining Max luminance output by the area-active-control/luminance-stretching portion of the video display device of FIG. 1.

FIG. 8 is a diagram for explaining the Max luminance of each of the frames $f_N$ and $f_{N+1}$ output by the area-active-control/luminance-stretching portion 4. A graph depicted in FIG. 8 is the graph same as that depicted in FIG. 2.

As above, the area-active-control/luminance-stretching portion 4 is input with the video signal to which the one mapping produced by the mapping portion 3 is applied, executes the area active control based on the video signal, and determines the Max luminance based on the average lighting rate. The frame in this case is represented by "frame $f_N$". The value of the Max luminance of the frame $F_N$ is output to the mapping portion 3. The mapping portion 3 produces the information on the tone mapping as depicted in FIG. 7 using the Max luminance of the frame $f_N$ input thereinto, and applies the produced information to the video signal of the frame $f_{N+1}$.

As above, in this embodiment, the Max luminance, based on the average lighting rate of the area active control is fed back and is used for the tone mapping of the next frame. As described with reference to FIG. 7, the mapping portion 3 applies the gain (the first gain G1) that reduces the video output to the area whose gray level value is lower than the first threshold value Th1 based on the Max luminance determined for the frame $f_N$. The video output between Th1 and Th2 is reduced by applying the second gain G2 linearly connecting the Th1 to Th2, to the region between Th1 and Th2.

In the example of FIG. 8, the gain reducing the video output of the non-light emitting portion in the frame $f_N$ is applied to the high lighting rate area whose average lighting rate is equal to or higher than P. Therefore, in the frame $f_{N+1}$, the maximal gray level value of each area tends to reduce and the lighting rate thereof tends to reduce, and in the frame $f_{N+1}$, the Max luminance tends to increase. Thereby, in the frame $f_{N+1}$, the luminance stretch amount of the backlight tends to further increase and the feeling of brightness from the screen tends to increase. However, this trend is not observed in the area whose lighting rate is lower than P and an opposite trend is observed.

Figure 9:
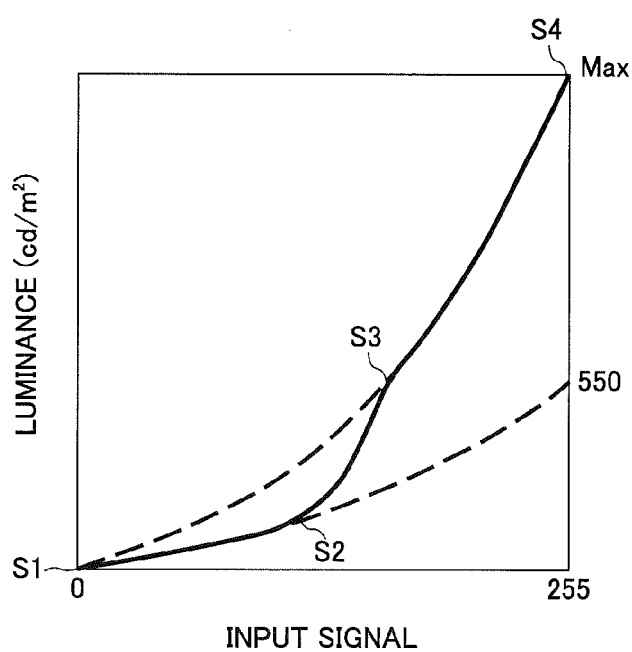
FIG. 9 is a diagram of the state where the screen luminance is enhanced by processing executed by the area-active-control/luminance-stretching portion of the video display device of FIG. 1.

FIG. 9 is a diagram of the state where the screen luminance is enhanced by the processing by the area-active-control/luminance-stretching portion 4. In FIG. 9, the axis of abscissa represents the gray level value of the input video signal, the axis of ordinate represents the screen luminance cd/m²) of the displaying portion 8, "S2" and "S3" respectively correspond to the positions of the gray level values of the first and the second threshold values Th1 and Th2 used by the light emission detecting portion 2.

As above, signal processing of reducing the output gray level of the video signal according to the luminance stretch amount of the backlight is not executed for the area whose gray level value is equal to or higher than the second threshold value Th2 detected by the light emission detecting portion 2. As a result, from S3 to S4, the input video signal is displayed after being enhanced based on the γ-curve according to the Max luminance determined by the area active control. "S4" represents the screen luminance acquired when the input video signal has the maximal gray level value (255), and for example, when the Max luminance is 1,500 (cd/m²), the screen luminance at the maximal gray level is 1,500 (cd/m²).

On the other hand, for the input gray level values from S1 to S2, as above, the first gain G1 is applied to the video signal such that the amount of the screen luminance increased by the luminance stretching of the backlight is reduced, and therefore, the screen display is executed according to the γ-curve based on the reference luminance. This is because the mapping portion 3 suppresses the output value, of the video signal into a range lower than the threshold value Th1 (corresponding to S2) corresponding to the amount of the luminance stretching, according to the Max luminance determined by the area-active-control/luminance-stretching portion 4. From S2 to S3, the screen luminance transitions according to the tone mapping of Th1 to Th2.

When the Max luminance is increased, the difference in the screen luminance direction is increased between the curve based on the reference luminance from S1 to S2 and the curve based on the Max luminance from S3 to S4. As above, the curve, based on the reference luminance is the γ-curve with which the screen luminance having the maximal gray level value is the reference luminance acquired when the backlight luminance is not stretched (the screen luminance having the maximal gray level value is 550 cd/m² as an example). The curve based on the Max luminance is the γ-curve with which the screen luminance having the maximal gray level value is the Max luminance determined by the area-active-control/luminance-stretching portion 4.

In this manner, the screen luminance is controlled with the reference luminance for the input video signal to be at the zero gray level (S1) to S2. When the low-gray level and dark video is displayed with increased luminance, the quality level degradation is caused such as reduction of the contrast and the misadjusted black level, and therefore, any increase of the screen luminance is prevented by suppressing the luminance by the video signal processing by the amount of the luminance stretching of the backlight.

The range for the input video signal to be equal to or higher than S3 is the range within which the light is regarded as being emitted, and therefore, the video signal is maintained, without being suppressed, with the backlight stretched by the luminance stretching. Thereby, the screen luminance is enhanced, and image display at a high quality level providing stronger feeling of brightness can be executed. The γ-curve from S1 to S2 does not need to be matched with the reference luminance, and can be set by properly adjusting the gain G1 only when the curve is at the level to cause a difference between the curve and the enhanced area of the light emitting portion.

Second Embodiment

Figure 10:
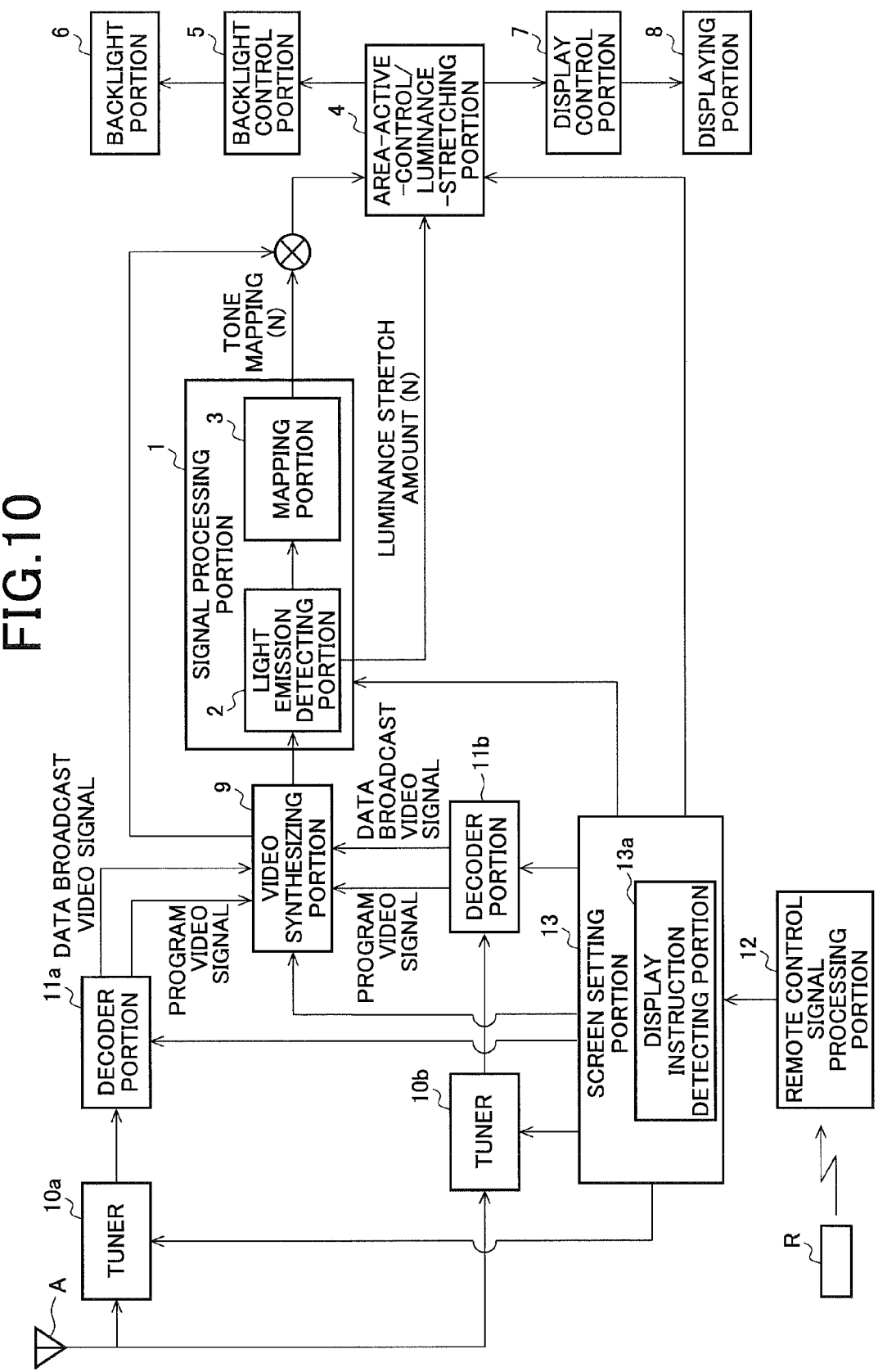
FIG. 10 is a diagram for explaining another embodiment of the video display device according to the present invention and depicts another exemplary configuration of the purview of the video display device.

FIG. 10 is a diagram for explaining another embodiment (a second embodiment) of the video display device: according to the present invention and depicts another exemplary configuration of the purview of the video display device.

The video display device of the second embodiment has the same configuration as that of the video display device of the first embodiment but differs from the video display device of the first embodiment in that the area-active-control/luminance-stretching portion 4 does not determine the value of the Max luminance used when the tone mapping is executed; the light emission detecting portion 2 determines the luminance stretch amount based on the result of the detection of the light emitting portion; and the mapping portion 3 executes the tone mapping based on the determined luminance stretch amount. Therefore, not as in the first embodiment, the mapping portion 3 does not need to acquire the Max luminance value by the luminance stretching from the area-active-control/luminance-stretching portion 4. Obviously, the light emission detecting portion 2 may be configured to only detect the light emitting portion and the mapping portion 3 may be configured to calculate the luminance stretch amount from the result of the detection of the light emitting portion.

Figure 11:
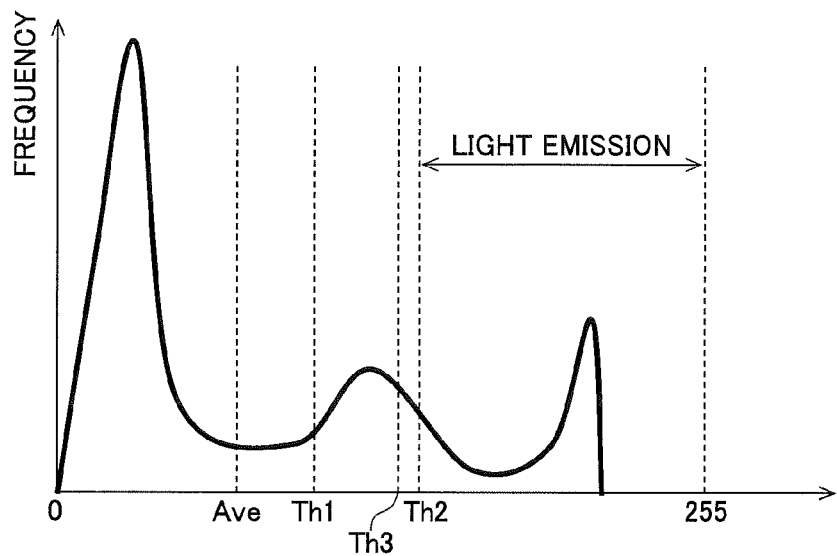
FIG. 11 is a diagram of an example of a histogram produced from the luminance signal of the input video signal.

FIG. 11 is a diagram of an example of the Y-histogram produced from the luminance signal Y of the video signal. The video signal is output by the video synthesizing portion 9. For the two-screen display, similarly to the first embodiment, the signal processing portion 1 discontinues the processing of the light emission detecting portion 2, and therefore, a process described below is executed only for the video signal for one-screen display.

Similarly to the first embodiment, the light emission detecting portion 2 produces the Y-histogram by integrating the number of pixels for each luminance gray level of the pixels for each frame of the input video signal, calculates the average value (Ave) and the standard deviation (σ) from the Y-histogram, and calculates the two threshold values Th1 and Th2 using these. Similarly to the first embodiment, the second threshold value Th2 determines the light emission boundary, and the pixels whose gray level values are each equal to or higher than the threshold value Th2 in the Y-histogram are each regarded as emitting light.

In this embodiment, a third threshold value Th3 is further set. The third threshold value Th3 is positioned between Th1 and Th2 and is provided to detect the state of the pixels in the light emitting portion. The value of the threshold value Th3 may be equal to that of Th2. However, the threshold value Th3 is provided to facilitate the execution of the processing by setting the light emitting portion equal to or higher than Th2 to be wider by including a margin therein. Therefore, Th3 is expressed as in Eq. (4) below.

$$Th3 = Ave + Q\sigma(M < Q \leq N) \qquad \text{Eq. (4)}$$

Figure 12:
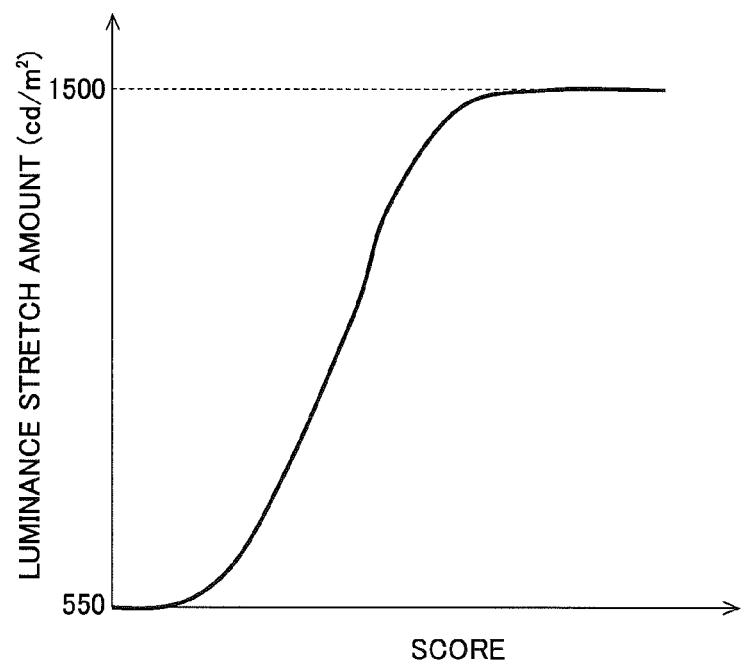
FIG. 12 is a diagram of an exemplary setting of luminance stretching corresponding to pixels whose gray level values are each equal to or greater than a third threshold value.

FIG. 12 is a diagram of an exemplary setting of luminance stretching corresponding to pixels whose gray level values are each equal to or higher than the third threshold value Th3. The axis of abscissa represents the score of the pixel value equal to or higher than the threshold value Th3, and the axis of ordinate represents the luminance stretch amount corresponding to the score.

The score is defined as [the rate of pixels whose luminance is higher than a threshold value]×[the distance from the threshold value (the difference in the luminance)], represents the degree of brightness acquired by counting the number of pixels each having the gray level value greater than the third threshold value Th3 and calculating after weighting each distance from the threshold value. Th3, and is calculated according to, for example, Eq. (5) below.

[Eq. 1]

$$\text{Score} = 1.00 \times \sum_{i > Th3} \{(\text{count}[i] \times (i^2 - (Th3)^2)\} / (\text{the total number of pixels} \times (TH3)^2)\} \qquad \text{Eq. (5)}$$

In Eq. (5), "count [i]" is the value acquired by counting the number of pixels for each gray level value i. "$i^2-(Th3)^2$" refers to the distance (the difference in the luminance) for the luminance as depicted in FIG. 11, and instead, the distance from the threshold value at the intensity L* may be employed. The squared i represents the luminance and this is i to the 2.2nd in practice. When the digital code value is i, the luminance is $i^{2.2}$. In this case, the intensity L* is $(i^{2.2})^{1/3} \approx i$. As the result of verification executed using the actual video display device, the difference from the threshold value for the luminance is more effective than the difference from the threshold value in the intensity, etc. In Eq. (5), the total number of pixels refers to the value acquired by counting the total number of pixels not limiting to those with i that is i>Th3. In the case where this calculated value is employed as the score, the score becomes high when many pixels at high gray levels away from Th3 are included in the light emitting portion. Even in the case where the number of pixels whose gray levels are each higher than Th3 is fixed, the score becomes higher when pixels at high gray levels are more.

When the score is at a level higher than a specific level, the feeling of brightness is increased by setting the luminance stretch amount to be high and stretching the high-gray level and brilliant video to cause this video to have higher luminance. In this example, in a portion whose score is higher than the specific level, the luminance stretch amount therefor is set such that the maximal screen luminance capable of being taken after the luminance stretching is 1,500 (cd/m²). When the score is low, the luminance stretch amount is set such that the luminance stretch amount becomes smaller as the score becomes lower.

The luminance stretch amount is that described in the first embodiment and is represented by, for example, the value of the backlight duty similarly to the Max luminance. The values of the first and the second threshold values Th1 and Th2 detected by the light emission detecting portion 2 and the luminance stretch amount determined according to the score of the pixels whose gray level values are each equal to or higher than Th3 are output to the mapping portion 3 and are used for the production of the information on the tone mapping.

The tone mapping processing executed by the mapping portion 3 is the same as that in the first embodiment. As depicted in FIG. 6, the first gain G1 is set for the area whose gray level value is lower than Th1 detected by the light emission detecting portion 2 and the second gain G2 is set to linearly connect Th1 to Th2. In this case, in setting the gain G1, the mapping portion 3 reduces the luminance by executing the video signal processing corresponding to the luminance stretch amount of the backlight using the luminance stretch amount detected by the light emission detecting portion 2.

The acquired tone mapping is applied to the video signal output by the video synthesizing portion 9, and thereafter, the video signal is output to the area-active-control/luminance-stretching portion 4.

The processing executed by the area-active-control/luminance-stretching portion 4 is the same as that in the first embodiment. However, not as in the first embodiment, the area-active-control/luminance-stretching portion 4 does not need to determine the Max luminance from the average lighting rate of the backlight and output the Max luminance to the signal Processing portion 1, and in contrast, stretches the LED luminance of the backlight portion 6 based on the luminance stretch amount detected by the light emission detecting portion 2 of the signal processing portion 1.

The area-active-control/luminance-stretching portion 4 divides the video into the predetermined plural areas (the areas), extracts the maximal gray level value of the video signal for each of the divided areas, and determines the lighting rate of the LEDs for each area corresponding to the extracted maximal gray level value. For example, the backlight luminance is reduced by reducing the lighting rate for the low-maximal gray level value and dark area. In this state, the overall luminance of the backlight is increased by increasing the input power for the overall backlight corresponding to the luminance stretch amount. Thereby, the light-emitting and bright video becomes brighter and provides stronger feeling of brightness. In the non-light emitting portion, the luminance thereof is reduced by an amount corresponding to that of the luminance stretching by the video signal processing, and as a result, the luminance is increased only in the light emitting portion on the screen and a high-contrast and high-quality level video can be displayed. The relation between the input video signal and the screen luminance is the same as that depicted in and described with reference to FIG. 9 in the first embodiment.

As above, for the video in the predetermined range including the area of the detected light emitting portion (the range of the gray level value equal to or higher than Th3 in the above example), the light emission detecting portion 2: count the number of pixels with weighting the brightness of each pixel; thereby, calculates the score thereof representing the degree of the brightness; and determines the luminance stretch amount according to the score, and the area-active-control/luminance-stretching portion 4 executes the stretching with the luminance stretch amount. Therefore, the luminance stretch amount is output to the area-active-control/luminance-stretching portion 4 and the mapping portion 3. The area-active-control/luminance-stretching portion 4 stretches the luminance corresponding to the luminance stretch amount. The mapping portion 3 reduces the stretched luminance using the video signal processing such as varying the gain curve corresponding to the luminance stretch amount.

The signal processing portion 1 and the area-active-control/luminance-stretching portion 4 execute or discontinue the light emitting portion enhancement processing according to the result of the detection by the display instruction detecting portion 13*a*. For example, the signal processing portion 1 and the area-active-control/luminance-stretching portion 4 discontinues the light emitting portion enhancement processing when the display instruction detecting portion 13*a* detects that the two-screen display is executed, and executes the light emitting portion enhancement processing when the display instruction detecting portion 13*a* detects that the one-screen display is executed. The configuration of the display instruction detecting portion 13*a* according to the present invention is the same as that in the first embodiment and will not again be described.

When the light emitting portion enhancement processing is discontinued, the signal processing portion 1 discontinues the processing in the light emission detecting portion 2, and therefore, the luminance stretch amount (N) is not calculated and the luminance stretch amount (N) is not output to the mapping portion 3 and the area-active-control/luminance-stretching portion 4.

In this case, the mapping portion 3 outputs to the multiplier, for example, the tone mapping with its default setting (such as a tone curve whose input and output correspond to each other at 1:1 as an example). The area-active-control/luminance-stretching portion 4 discontinues the processing concerning the area active control and the luminance stretching, outputs to the backlight control portion 5 the control data to control the backlight portion 6 for the input video signal, and outputs to the display control portion 7 the display control data to control the displaying portion 8. For example, pieces of data each with its default setting can be used as the control data and the display control data.

The area active control may be executed in the same manner as that in the first embodiment. For example, as depicted in (C) of FIG. 4 above the maximal gray level value of the video signal is extracted for each divided area and the lighting rate (the driving duty) of the LEDs is determined for each area according to the extracted maximal gray level value. In this case, no luminance stretching is executed, and therefore, the processing for stretching the backlight luminance according to the Max luminance acquired from the average lighting rate is not executed.

Third Embodiment

Figure 13:
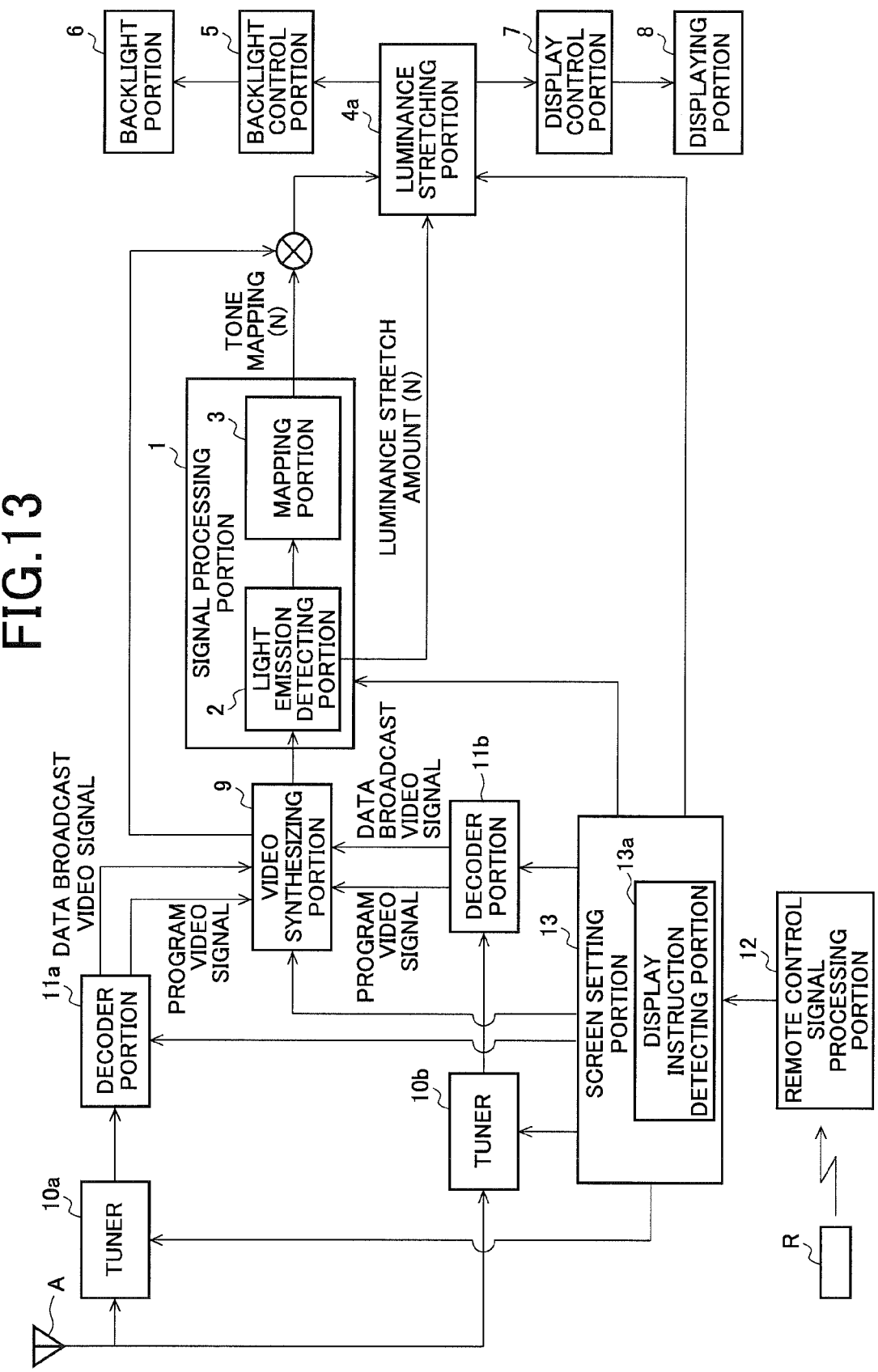
FIG. 13 is a diagram for explaining another embodiment of the video display device according to the present invention and depicts another exemplary configuration of the purview of the video display device.

FIG. 13 is a diagram for explaining another embodiment (a third embodiment) of the video display device according to the present invention and depicts another exemplary configuration of the purview of the video display device.

The video display device of the third embodiment has the same configuration as that of the video display device in the second embodiment; and executes the same operation as that in the second embodiment; but differs from the video display device of the second embodiment in that this video display device includes a luminance stretching portion 4*a* that does not executes the area active control, instead of the area-active-control/luminance-stretching portion 4. The luminance stretching portion 4*a* stretches the luminance of the backlight portion 6 using the luminance stretch amount output from the mapping portion 3 of the signal processing portion 1.

The luminance stretching portion 4*a* is input with the video signal to which the tone mapping is applied using the information on the tone mapping produced by the mapping portion 3, and outputs the display control data to display the video signal, to the display control portion 7. In this case, the processing based on the area active control is not executed. On the other hand, the luminance, stretching portion 4*a* uniformly stretches the overall backlight portion 6 using the luminance stretch amount output from the light emission detecting portion 2.

Thereby, the light emitting and bright video becomes brighter and provides stronger feeling of brightness. In the non-light emitting portion, the amount of the luminance thereof corresponding to the amount of the luminance stretching is reduced by the video signal processing, and therefore, as a result, the luminance of the light emitting portion is increased on the screen and a high contrast and high quality level video can be displayed.

The signal processing portion 1 and the luminance stretching portion 4*a* execute or discontinue the light emitting portion enhancement processing according to the result of the determination by the display instruction detecting portion 13*a*. For example, the signal processing portion 1 and the luminance stretching portion 4*a* discontinues the light emitting portion enhancement processing when the display instruction detecting portion 13*a* detects that the two-screen display is executed, and execute the light emitting portion enhancement processing when the display instruction detecting portion 13a detects that the one-screen display is executed. The configuration of the display instruction detecting portion 13a according to the present invention is the same as those in the first and the second embodiments, and therefore, will not again be described in detail.

When the light emitting portion enhancement processing is discontinued, the signal processing portion 1 discontinues the processing in the light emission detecting portion 2, and therefore, the luminance stretch amount (N) is not calculated and the luminance stretch amount (N) is not output to the mapping portion 3 and the luminance stretching portion 4a.

In this case, the mapping portion 3 outputs to the multiplier, for example, the tone mapping with its default setting (such as a tone curve whose input and output correspond to each other at 1:1 as an example). The luminance stretching portion 4a discontinues the process concerning the luminance stretching, outputs to the backlight control portion 5 the control data to control the backlight portion 6 for the input video signal, and outputs to the display control portion 7 the display control data to control the displaying portion 3. For example, pieces of data each with its default setting can be used as the control data and the display control data.

In the first embodiment, instead of the area-active-control/luminance-stretching portion 4 of FIG. 1, the luminance, stretching portion 4a may be disposed that does not execute the area active: control, similarly to the third embodiment. With this configuration, the luminance stretching portion 4a only has to acquire the Max luminance from the average lighting rate (however, in this example, the tentative lighting rate itself is the tentative average lighting rate of the overall screen), increase the LEE: light emission luminance based thereon, and feeds back the Max luminance to the mapping portion 3.

Fourth Embodiment

Figure 14:
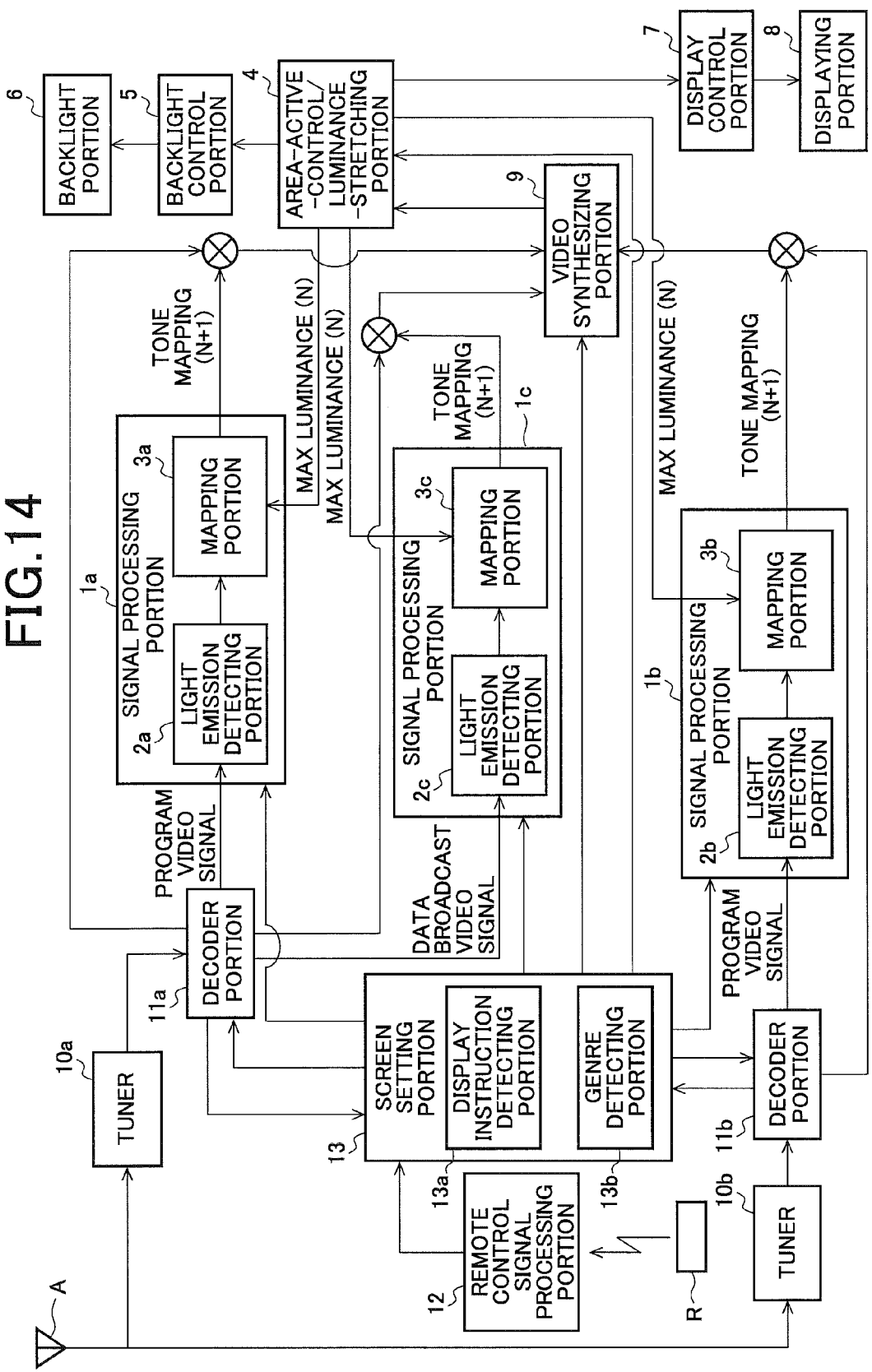
FIG. 14 is a diagram for explaining another embodiment of the video display device according to the present invention and depicts another exemplary configuration of the purview of the video display device.

FIG. 14 is a diagram for explaining another embodiment (a fourth embodiment) of the video display device according to the present invention and depicts another exemplary configuration of the purview of the video display device.

In the fourth embodiment, when the display instruction detecting portion 13a detects that the user issues an instruction to display the first input video signal and the second input video signal: a genre detecting portion 13b detects the genre of the first input video signal and the genre of the second input video signal; and the area-active-control/luminance-stretching portion 4 executes the light emitting portion enhancement processing for the first input video signal based on the setting of a first control property determined according to the information on the genre of the first input video signal, and executes the light emitting portion enhancement processing for the second input video signal based on the setting of a second control property determined corresponding to the information on the genre of the second input video signal.

The first input video signal and the second input video signal are, when the two-screen display of the video signals of the two programs is executed, the video signals of the two programs and are, when the two-screen display of the video signal of the program and the video signal of the data broadcast is executed, the video signal of the program and the video signal of the data broadcast. This process will be described in detail.

The genre information of the broadcast program is included as a genre code in, for example, a portion of electronic program information (EPG information) transmitted being superimposed on the broadcast signal of the digital broadcast. The broadcast signal is received by the tuners 10a and 10b and processed by decoding by the decoders 11a and 11b. The genre code is extracted as the genre information from the broadcast signal.

The genre code as the genre information is determined under the standard of the terrestrial digital broadcast. For example, such genres are defined in advance as the major classifications as "news/reports", "sports", "information/tabloid TV show", "drama", "music", "variety show", "movie", "cartoon films/special effect movie", "documentary/culture", "theatrical show/performance", "hobby/education", and "others".

Plural intermediate classifications are defined in each major classification. For example, such genres are defined as the intermediate classifications as, in the major classification of "sports", "sports news", "baseball", "soccer", "golf", "other ball sports", "sumo and combat sports" "The Olympic Games and international athletic meets", "marathon, track and field, and swimming", "motor sports", "ocean sports and winter sports", "horse race and public races", and "others". Such genres are defined as the intermediate classifications as, in the major classification of "movie", "foreign movies", "Japanese movies", "cartoon films", etc.

The video display device exemplified in FIG. 14 includes signal processing portions 1a, 1b, and 1c. The signal processing portions 1a and 1b are the processing portions that process the video signals of the programs respectively acquired by the decoding processing by the decoders 11a and 11b. The signal processing portion 1c is the processing portion that processes the video signal of the data broadcast acquired by the decoding processing by the decoder 11a.

The signal processing portions 1a, 1b, and 1c respectively include light emission detecting portions 2a, 2b, and 2c, and mapping portions 3a, 3b, and 3c. The light emission detecting portions 2a and 2b executes detection of the light emitting portion for the video signals of the programs to which the decoding processing is applied, by the decoder portions 11a and 11b in the manner described in the first embodiment. The light emission detecting portion 2c executes detection of the light emitting portion for the video signal of the data broadcast to which the decoding processing is applied by the decoder portion 11a.

Figure 15:
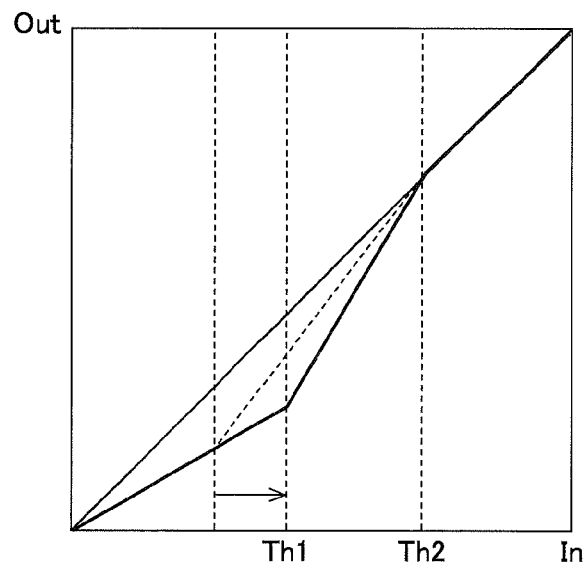
FIG. 15 is a diagram of an example of tone mapping produced by a mapping portion of the video display device of FIG. 14.

As depicted in an example of FIG. 15, when the genre information indicates, for example, "movie", the mapping portions 3a and 3b apply to the video signal tone mapping (a solid line of FIG. 15) whose first threshold value Th1 is set to be a greater value instead of the tone mapping (a dotted line of FIG. 15) depicted in FIG. 7. Thereby, the contrast of the video can further be increased.

Similarly, for the other pieces of genre information and other data broadcasts, the control property of the Max luminance and the tone mapping are set. Using these, the mapping portions 3a and 3b execute the tone mapping corresponding to the genre information, and the mapping portion 3c executes the tone mapping corresponding to the data broadcast. Thereby, the optimal display can be executed for each input video signal.

The genre detecting portion 13b acquires the genre information of the video signal of the program from the decoder portions 11a and 11b. The genre detecting portion 13b outputs the acquired genre information to the signal processing portions 1a and 1b, and the area-active-control/luminance-stretching portion 4. When the display detecting portion 13a detects that an instruction is issued to execute the two-screen display of the video signal of the program and the video signal of the data broadcast, the genre detecting portion 13b notifies the signal processing portion 1c that the video signal of the data broadcast is input thereinto. When the signal processing portion 1c receives the notification, the signal processing portion 1c is started up, and the signal processing is executed according to the control property set for the video signal of the data broadcast.

When the video signals of the two programs are two-screen-displayed, the video synthesizing portion 9 synthesizes the video signals of the two programs to which the tone mapping is applied, with each other, and outputs the video signal acquired as the result of the synthesis to the area-active-control/luminance-stretching portion 4. When the video signal of the program and the video signal of the data broadcast are two-screen-displayed, the video synthesizing portion 9 also synthesizes the video signals of the program and the video signal of the data broadcast to which the tone mapping is applied, with each other, and outputs the video signal acquired as the result of the synthesis to the area-active-control/luminance-stretching portion 4. When the video signal of one program is one-screen-displayed, the video synthesizing portion 9 does not synthesize the video signal of the one program to which the tone mapping is applied, with any other video signal and outputs the video signal as it is to the area-active-control/luminance-stretching portion 4.

Figure 16:
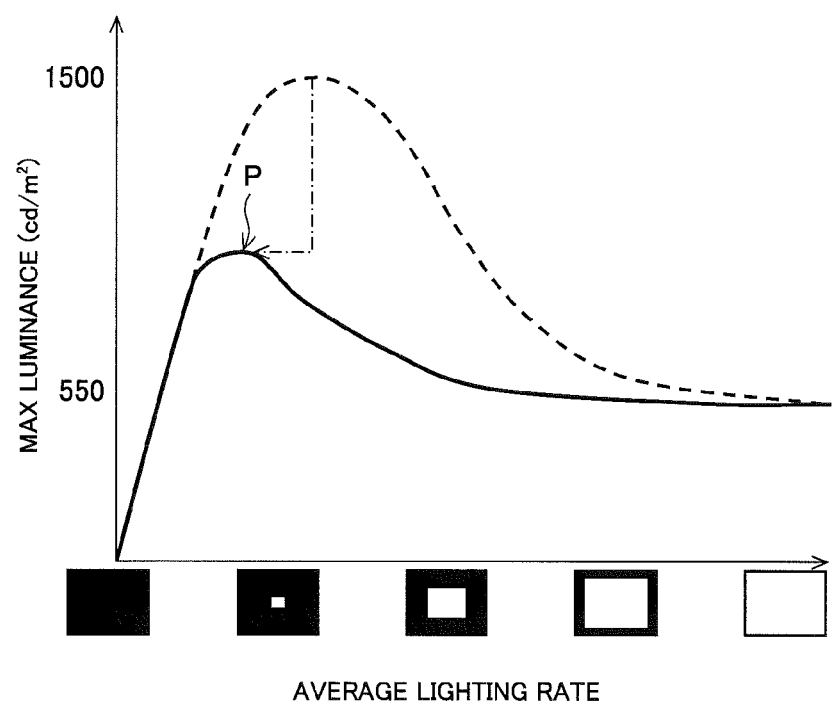
FIG. 16 is a diagram for explaining exemplary processing executed by an area-active-control/luminance-stretching portion of the video display device of FIG. 14.

The area-active-control/luminance-stretching portion 4 executes the light emitting portion enhancement processing corresponding to the genre of the input video signal. For example, as depicted in FIG. 16, when the genre information indicates "movie", the area-active-control/luminance-stretching portion 4 uses a graph of the control property (a solid line of FIG. 16) whose Max luminance value is suppressed in a region with an intermediate average lighting rate and whose average lighting rate P with the maximal Max luminance value is set at a somewhat lower position, instead of the graph of the control property (a dotted line of FIG. 16) of the Max luminance depicted in FIG. 2. Thereby, the video can be displayed suppressing the dazzle felt by the user to closely watch the movie and emphasizing the brilliance of the bright portion having a relatively small area.

When the two-screen display is executed, the average lighting rate and the Max luminance are calculated for each video signal. From the lighting rate of each area of the backlight corresponding to the one video signal, the average lighting rate of the video signal is calculated and the Max luminance is determines from the average lighting rate. From the lighting rate of each area of the backlight corresponding to the other video signal, the average lighting rate of this video signal is calculated and the Max luminance is determines from the average lighting rate.

The other configuration of the video display device depicted in FIG. 14 is the same as the configuration described with reference to FIG. 1 in the first embodiment and will not again be described.

Fifth Embodiment

Figure 17:
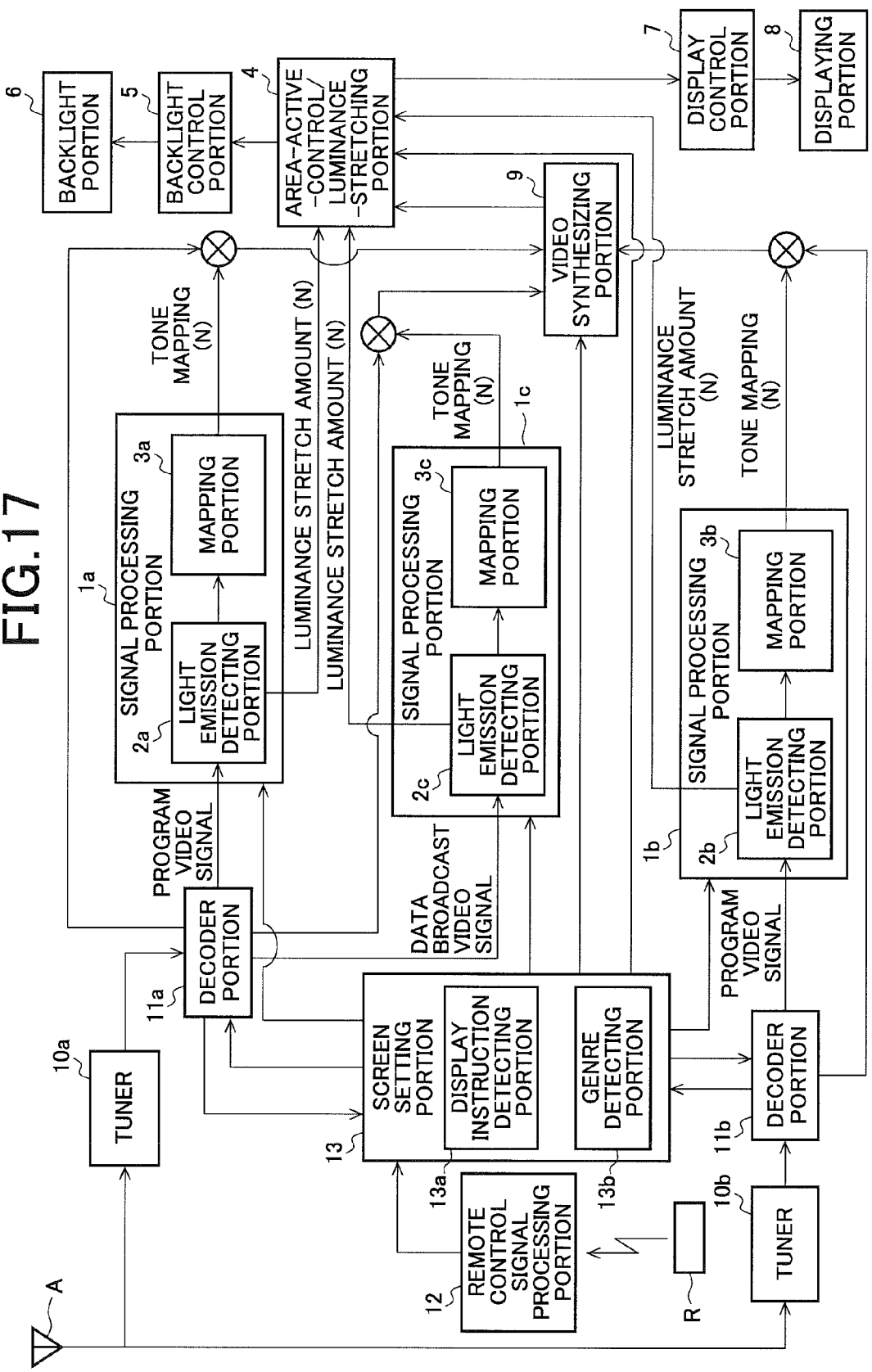
FIG. 17 is a diagram for explaining another embodiment of the video display device according to the present invention and depicts another exemplary configuration of the purview of the video display device.

FIG. 17 is a diagram for explaining another embodiment (a fifth embodiment) of the video display device according to the present invention and depicts another exemplary configuration of the purview of the video display device.

The video display device of the fifth embodiment has the same configuration as that of the video display device of the fourth embodiment but differs from the video display device of the fourth embodiment in that the area-active-control/luminance-stretching portion 4 does not determine the value of the Max luminance used in executing the tone mapping, the light emission detecting portions 2a, 2b, and 2c determine the luminance stretch amount based on the result of the detection of the light emitting portion, and the mapping portions 3a, 3b, and 3c execute the tone mapping based on the determined luminance stretch amount.

Therefore, the mapping portions 3a, 3b, and 3c do not need to acquire the Max luminance value by the luminance stretching from the area-active-control/luminance-stretching portion 4 not like the fourth embodiment. Obviously, the light emission detecting portions 2a, 2b, and 2c may only detect the light emitting portion and the mapping portions 3a, 3b, and 3c may calculate the luminance stretch amount from the result of the detection of the light emitting portion.

The tone mapping is executed as below. The light emission detecting portions 2a, 2b, and 2c each produce the Y-histogram as depicted in FIG. 11 by integrating the number of pixels for each luminance gray level of the pixels for each frame of the video signal of the input program or the video signal of the data broadcast.

The light emission detecting portions 2a, 2b, and 2c calculate the average value (Ave) and the standard deviation ($\sigma$) from the Y-histogram, and calculate the two threshold values Th1 and Th2 using these. The light emission detecting portions 2a, 2b, and 2c each set the third threshold value Th3. Th3 is calculated according to, for example, Eq. (4) described in the second embodiment.

For example, as described in the second embodiment, the light emission detecting portions 2a, 2b, and 2c calculate according to Eq. (5) the score representing the degree of the brightness acquired by calculation by counting the number of pixels each having the gray level value equal to or greater than the third threshold value Th3 and weighting the distances from the threshold value Th3.

As in an example depicted in FIG. 12, when the score is at a level higher than a specific level, the feeling of brightness is increased by setting the luminance stretch amount to be high and stretching the high-gray level and brilliant video to cause this video to have higher luminance. In this example, in a portion whose score is higher than the specific level, the luminance stretch amount therefor is set such that the maximal screen luminance capable of being taken after the luminance stretching is 1,500 (cd/m$^2$). When the score is low, the luminance stretch amount is set such that the luminance stretch amount becomes smaller as the score becomes lower.

The luminance stretch amount determined according to the values of the first and the second threshold values Th1 and Th2 detected by each of the light emission detecting portions 2a, 2b, and 2c, and the score of the pixels whose gray level values are each equal to or greater than Th3 is output to the mapping portions 3a, 3b, and 3c, and is used in producing the information on the tone mapping.

The processing for the tone mapping executed by the mapping portions 3a, 3b, and 3c is the same as that in the fourth embodiment. As depicted in FIG. 15, the first gain G1 is set for the area whose gray level value is smaller than Th1 detected by the light emission detecting portions: 2a, 2b, and 2c, and the gain G2 is set to linearly connect Th1 to Th2. In this case, in setting the gain G1, the mapping portions 3a, 3b, and 3c reduce the luminance using the video signal processing according to the luminance stretch amount of the backlight using the luminance stretch amount detected by the light emission detecting portions 2a, 2b, and 2c.

The acquired tone mapping is applied to the video signal of the program or the video signal of the data broadcast output by the decoder portions 11a and 11b. Specifically, when the two-screen display of the video signals of the two programs is executed, the tone mapping is applied to each of the video signals of the two programs output by the decoder portions 11a and 11b. When the two-screen display of the video signal of the program and the video signal of the data broadcast is executed, the tone mapping is applied to each of the video signal of the program and the video signal of the data broadcast output by the decoder portion 11a. When the one-screen display of the video signal of the program is executed, the tone mapping is applied to the video signal of the program output by the decoder portion 11a.

When the two-screen display is executed to display the video signals of the two programs, the video synthesizing portion 9 synthesizes the video signals of the two programs to which the tone mapping is applied with each other, and outputs the video signal acquired as the result of the synthesis to the area-active-control/luminance-stretching portion 4. When the data broadcast display is executed to display the video signal of the program and the video signal of the data broadcast, the video synthesizing portion 9 synthesizes the video signal of the program and the video signal of the data broadcast to which the tone mapping is applied with each other, and outputs the video signal acquired as the result of the synthesis to the area-active-control/luminance-stretching portion 4. When the one-screen display is executed of the video signal of the program, the video synthesizing portion 9 does not synthesize the video signal of the one program to which the tone mapping is applied, with any other video signal, and outputs the video signal to the area-active-control/luminance-stretching portion 4.

The processing executed by the area-active-control/luminance-stretching portion 4 is the same as that in the fourth embodiment. However, not as in the fourth embodiment, the area-active-control/luminance-stretching portion 4 does not need to determine the Max luminance from the average lighting rate of the backlight and output the Max luminance to the signal processing portions 1a, 1b, and 1c, and in contrast, stretches the LED luminance of the backlight portion 6 based on the luminance stretch amount detected by the light emission detecting portions 2a, 2b, and 2c of the signal processing portions 1a, 1b, and 1c.

The area-active-control/luminance-stretching portion 4 divides the video into the predetermined plural areas (areas), extracts the maximal gray level value of the video signal for each of the divided areas, and determines the LED lighting rate for each area corresponding to the extracted maximal gray level value. For example, the backlight luminance is reduced by reducing the lighting rate for the low-maximal gray level value and dark area. In this state, the overall luminance of the backlight is increased by increasing the input power for the overall backlight corresponding to the luminance stretch amount. Thereby, the light-emitting and bright video becomes brighter and provides stronger feeling of brightness. Since the luminance of the non-light emitting portion is reduced by an amount corresponding to that of the luminance stretching by the video signal processing, and as a result, the luminance of only the light emitting portion is increased on the screen and a high-contrast and high-quality level video can be displayed. The relation between the input video signal and the screen luminance is the same as that depicted in FIG. 9 described in the first embodiment.

As above, for the video in the predetermined range including the area of the detected light emitting portion (the range of the gray level value equal to or higher than Th3 in the above example), the light emission detecting portions 2a, 2b, and 2c: count the number of pixels with weighting the brightness of each pixel; thereby, calculate the score thereof representing the degree of the brightness; and determine the luminance stretch amount according to the score. The area-active-control/luminance-stretching portion 4 executes this stretching using the luminance stretch amount. Therefore, the luminance stretch amount is output to the area-active-control/luminance-stretching portion 4 and the mapping portions 3a, 3b, and 3c. The area-active-control/luminance-stretching portion 4 stretches the luminance corresponding to the luminance stretch amount. The mapping portions 3a, 3b, and 3c reduce the stretched luminance by the video signal processing such as varying the gain curve corresponding to the luminance stretch amount.

As described in the fourth embodiment, when the display instruction detecting portion 13a detects that the instruction is issued to display the second input video signal together with the first input video signal, the signal processing portions 1a, 1b, and 1c, and the area-active-control/luminance-stretching portion 4 execute the light emitting portion enhancement processing for the first input video signal based on the setting of the first control property, and execute the light emitting portion enhancement processing for the second input video signal based on the setting of the second control property.

When the two-screen display of the video signals of two programs is executed, the first input video signal and the second input video signal are the video signals of the two programs, and when the two-screen display of the video signal of a program and the video signal of data broadcast is executed, are the video signal of the program and the video signal of the data broadcast.

For example, using the method described with reference to FIG. 15 in the fourth embodiment, the mapping portions 3a, 3b, and 3c execute the tone mapping according to the genre of the video signal detected by the genre detecting portion 13b for each video signal. Using the method described with reference to FIG. 16 in the fourth embodiment, the area-active-control/luminance-stretching portion 4 adjusts the luminance of the backlight portion 6 according to the genre of the video signal detected by the genre detecting portion 13b for each video signal.

The other configurations of the video display device depicted in FIG. 17 are the same as those described with reference to FIG. 14 in the fourth embodiment and will not again be described.

Sixth Embodiment

Figure 18:
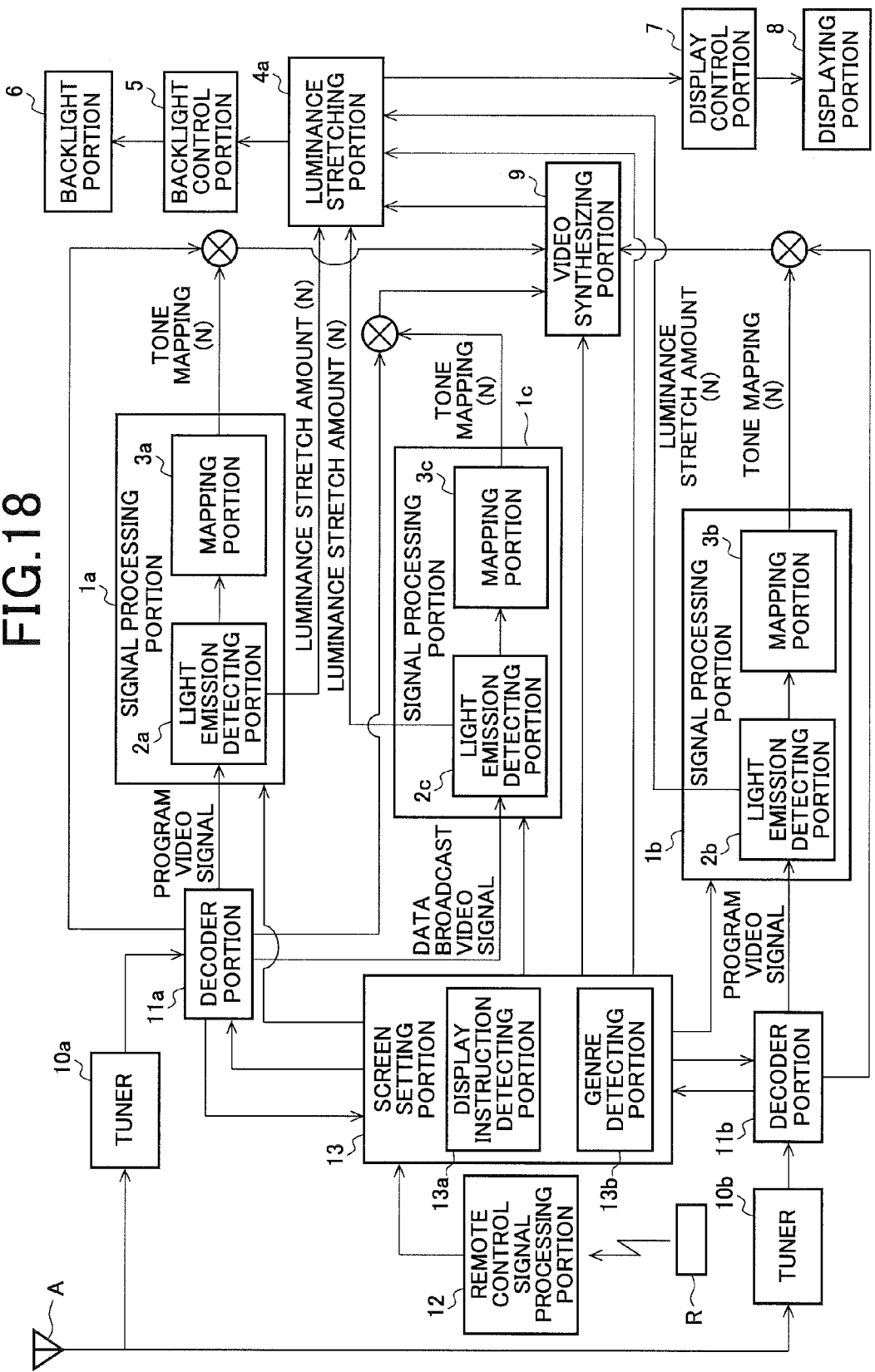
FIG. 18 is a diagram for explaining another embodiment of the video display device according to the present invention and depicts another exemplary configuration of the purview of the video display device.

FIG. 18 is a diagram for explaining another embodiment (a sixth embodiment) of the video display device according to the present invention and depicts another exemplary configuration of the purview of the video display device.

The video display device of the sixth embodiment has the same configuration as that of the video display device of the fifth embodiment but differs from the video display device of the fifth embodiment in that, the video display device of the sixth embodiment includes the luminance, stretching portion 4a that does not execute the area active control, instead of the area-active-control/luminance-stretching portion 4. The luminance stretching portion 4a stretches the luminance of the backlight portion 6 using the luminance stretch amount output from the mapping portions 3a, 3b, and 3c of the signal processing portions 1a, 1b, and 1c.

The luminance stretching portion 4a is input with the video signal output by the video synthesizing portion 9, and outputs the display control data to display the video signal, to the display control portion 7. At this time, the processing according to the area active control is not executed. On the other hand, the luminance stretching portion 4a stretches the backlight portion 6 for the display screen of the video signal corresponding to each of the luminance stretch amounts using the luminance stretch amount output from the light emission detecting portions 2a, 2b, and 2c.

Thereby, the light emitting and bright video becomes brighter and provides stronger feeling of brightness. As to the non-light emitting portion, an amount of the luminance thereof corresponding to the amount of the luminance, stretching is reduced by the video signal processing, and therefore, as a result, the luminance, of the light emitting portion is increased on the screen and a high contrast and high quality level video can be displayed.

As described in the fourth embodiment, when the display instruction detecting portion 13a detects that the instruction is issued to display the second input video signal together with the first input video signal, the signal processing portions 1a, 1b, and 1c, and the area-active-control/luminance-stretching portion 4 execute the light emitting portion enhancement processing for the first input video signal based on the setting of the first control property, and execute the light emitting portion enhancement. Processing for the second input video signal based on the setting of the second control property.

When the two-screen display of the video signals of two programs is executed, the first input video signal and the second input video signal are the video signals of the two programs, and when the two-screen display of the video signal of a program and the video signal of data broadcast is executed, are the video signal of the program and the video signal of the data broadcast.

For example, using the method described with reference to FIG. 15 in the fourth embodiment, the mapping portions 3a, 3b, and 3c execute the tone mapping corresponding to the genre of the video signal detected by the genre detecting portion 13b for each video signal. Using the method described with reference to FIG. 16 in the fourth embodiment, the luminance stretching portion 4a adjusts the luminance of the backlight portion 6 according to the genre of the video signal detected by the genre detecting portion 13b.

The other configurations of the video display device depicted in FIG. 10 are the same as those described with reference to FIG. 14 in the fourth embodiment and will not again be described.

In the fourth embodiment, instead of the area-active-control/luminance-stretching portion 4, the luminance stretching portion 4a may be included that similarly does not execute the area active control. With this configuration: the luminance stretching portion 4a only has to acquire the Max luminance from the average lighting rate in this example, the tentative lighting rate itself is the tentative lighting rate of the overall screen); based on the acquired Max luminance, the LED light emission luminance only has to be increased; and the Max luminance only has to be fed back to the mapping portions 3a, 3b, and 3c.

(Other Feature Amounts)

In the examples, in the processing for detecting the light emitting portion executed by each of the light emission detecting portions 2, 2a, 2b, and 2c, the luminance Y is used as the feature amount of the video, the luminance histogram is produced, and the light emitting portion is detected from the produced histogram. However, in addition to the luminance, for example, a color mode index (CMI) or the highest gray level value of the gray level values of the RGB video signal constituting one pixel (hereinafter, referred to as "Max RGB") can be used as the feature amount used to produce the histogram.

The CMI is an index indicating at what degree the noted color is bright. In this case, the CMI is different from the luminance and indicates the brightness to which the information on the color is added. The CMI is defined by Eq. (6) below.

$$(L^*/L^*\text{modeboundary}) \times 100 \qquad \text{Eq. (6)}$$

"$L^*$" is an index of the relative brightness of a color, and when $L^*$ is $L^*=100$, indicates the intensity of white that is most bright as an object color. In Eq. (6), $L^*$ is the intensity of the noted color and "$L^*$modeboundary" is the intensity of the boundary observed as emitting light at the same chromaticity as that of the noted color. In this case, it is known that $L^*$modeboundary≈the intensity of the brightest color (the brightest color of object colors). The intensity of a color whose. CMI is CMI=100 is referred to as "light emitting color boundary" and it is defined that a CMI exceeding 100 represents emission of light.

Figure 19:
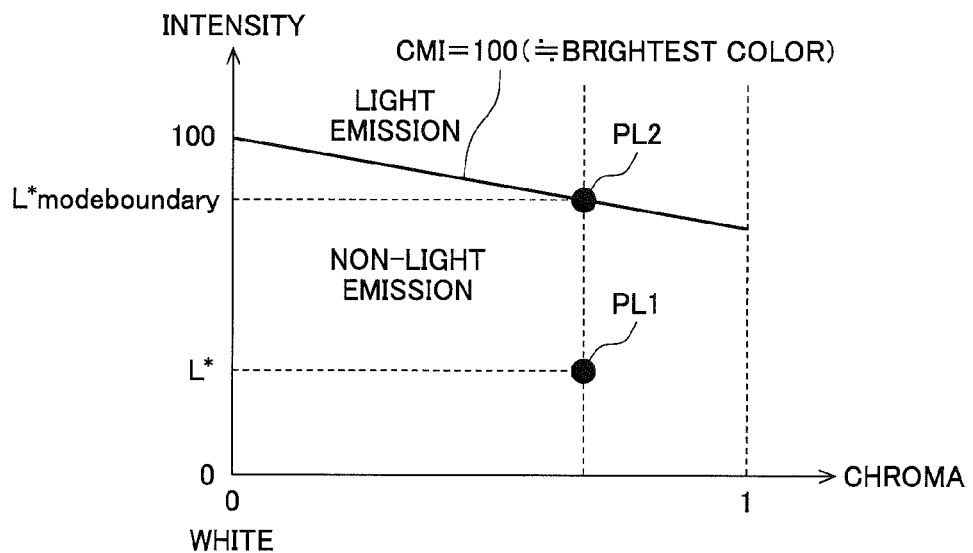
FIG. 19 is a diagram for explaining an approach of calculating a CMI from a broadcast video signal to be displayed on the video display device.

An approach of calculating the CMI from the broadcast video signal to be displayed on the video display device will be described with reference to FIG. 19. The broadcast video signal is normalized and transmitted based on the BT.709 standard. Therefore, the RGB data of the broadcast video signal is converted into data of the tri-stimulus values X, Y, and Z using a conversion matrix for the BT.709. The intensity $L^*$ is calculated using a conversion equation starting with that of Y. It is assumed that $L^*$ of the noted color is located at a position PL1 of FIG. 19. The chromaticity is calculated from each of the converted X, Y and Z, and $L^*(L^*\text{modeboundary})$ of the brightest color at the equal chromaticity to that of the noted color is checked from the data of the brightest color already known. The position in FIG. 19 is PL2.

From these values, the CMI is calculated using Eq. (6) above. The CMI is represented by the ratios of the $L^*$ of the noted pixel and the $L^*(L^*\text{modeboundary})$ of the brightest color at the chromaticity of the noted pixel.

The CMI is acquired for each pixel of the video signal using the above approach. The broadcast signal is normalized, and therefore, all the pixels each take any one CMI in a range from zero to 100. A CMI histogram is produced for one frame video using the axis of abscissa that represents the CMI and the axis of ordinate that represents the frequency. The average value Ave. and the standard deviation σ are calculated, the threshold values are set, and the light emitting portion is detected.

"Max RGB" is data having the maximal gray level value of pieces of RGB data. For combinations of R, G, and B, the fact that two colors have the equal chromaticity is synonymous with no variation of the ratios of R, G, and B. The process of computing the brightest color having the equal chromaticity for the CMI is the processing for acquiring the combination of R, G, and B with which the gray level of the RGB data becomes maximal when the RGB data is multiplied by a specific value without varying the ratios thereof.

Figure 20:
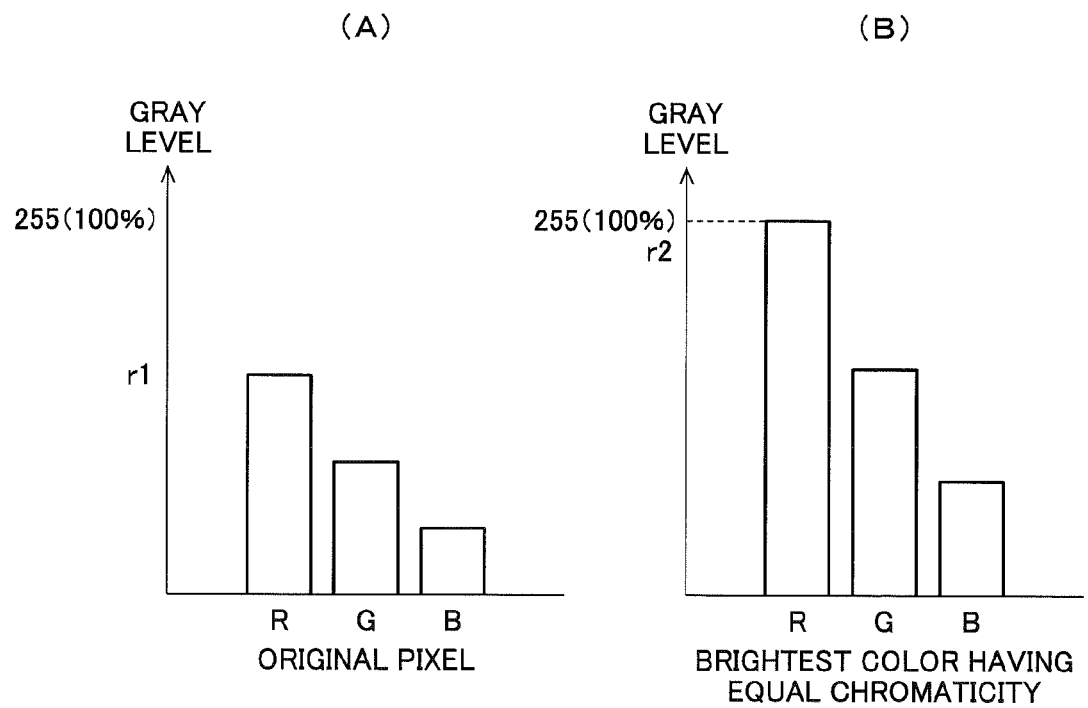
FIG. 20 is a diagram for explaining the brightest color for a pixel having the RGB data.

For example, the pixel having the RGB data at the dray level as depicted in (A) of FIG. 20 is set to be the noted pixel. In the case where the RGB data of the noted pixel is multiplied by a specific number, a color acquired when any one of R, G, and B is first saturated as depicted in (B) of FIG. 20 is the brightest color having the equal chromaticity as that of the original pixel. Representing the gray level of the noted pixel of the first saturated color (in this case, R) as "r1", and the gray level of R of the brightest color as "r2", a value similar to the CMI can be acquired according to Eq. (7) below. When the RGB is multiplied by the specific number, the first saturated color is the color having the maximal gray level of R, G, and B of the noted pixel.

$$(r1/r2) \times 100 \qquad \text{Eq. (7)}$$

The value according to Eq. ((7) is calculated for each pixel and the histogram is produced. The average value Ave and the standard deviation σ are calculated from this histogram, the threshold values are set, and thereby, the light emitting portion can be detected.

EXPLANATIONS OF LETTERS OR NUMERALS 1, 1a, 1b, 1c . . . signal processing portion, 2, 2a, 2b, 2c . . . light emission detecting portion, 3, 3a, 3b, 3c . . . mapping portion, 4 . . . area-active-control/luminance-stretching portion, 4a . . . luminance stretching portion, 5 . . . backlight control portion, 6 . . . backlight portion, 7 . . . display control portion, 8 . . . displaying portion, 5 . . . video synthesizing portion, 10a, 10b . . . tuner, 11a, 11b . . . decoder, 12 . . . remote control signal processing portion, 13 . . . screen setting portion, 13a . . . display instruction detecting portion, and 13b . . . genre detecting portion

The invention claimed is:

1. A video display device comprising a displaying portion that displays an input video signal, a light source that illuminates the displaying portion, and a control portion that controls the displaying portion and the light source, the video display device further comprising
a display instruction detecting portion that detects whether an instruction is issued to display on the displaying portion a second input video signal together with a first input video signal as the input video signal, wherein
the control portion controls a light emitting portion enhancement processing for enhancing display luminance of a light emitting portion of the input video signal by increasing luminance of the light source by stretching the luminance based on the input video signal, detecting a light emitting portion regarded as a light emitting video based on a predetermined feature amount relating to brightness of the input video signal, and reducing luminance of a video signal of a non-light emitting portion except the light emitting portion of the input video signal, and switches the control of the light emitting portion enhancement processing according to a result of the detection by the display instruction detecting portion, and wherein
the control portion divides an image by the input video signal into a plurality of areas, varies a lighting rate of an area of the light source corresponding to a divided area that is an area acquired by the division, based on a gray level value of a video signal of the divided area,
acquires an average lighting rate for a plurality of areas of the light source by averaging the lighting rates of the areas of the light source, and
stretches the luminance of the light source based on a maximal display luminance capable of being taken on a screen of the displaying portion correlated in advance with the average lighting rate.

2. The video display device as defined in claim 1, wherein when issuance is detected of an instruction to display the second input video signal together with the first input video signal, the control portion discontinues the light emitting portion enhancement processing.

3. The video display device as defined in claim 1, wherein when issuance is detected of an instruction to display the second input video signal together with the first input video signal, the control portion executes the light emitting portion enhancement processing for the first input video signal based on a setting of a first control property and executes the light emitting portion enhancement processing for the second input video signal based on a setting of a second control property.

4. The video display device as defined in claim 3, further comprising
a genre detecting portion that detects a first video genre of the first input video signal and a second video genre of the second input video signal, wherein
the setting of the first control property is determined based on the first video genre and the setting of the second control property is determined based on the second video genre.

5. The video display device as defined in claim 1, wherein the control portion produces a histogram by integrating number of pixels for the predetermined feature amount, and when representing an average value of the histogram as "A" and the standard deviation thereof as "σ", the control portion detects thresh=$A+N\sigma$($N$ is a constant)

or more pixels to be the light emitting portion.

6. The video display device as defined in claim 1, wherein the control portion reduces an amount of increase of the display luminance of the displaying portion by the luminance stretching of the light source in the non-light emitting portion by reducing the luminance of the input video signal.

7. A television receiving device comprising the video display device as defined in claim 1.

8. A video display device comprising a displaying portion that displays an input video signal, a light source that illuminates the displaying portion, and a control portion that controls the displaying portion and the light source, the video display device further comprising:
a display instruction detecting portion that detects whether an instruction is issued to display on the displaying portion a second input video signal together with a first input video signal as the input video signal, wherein
the control portion controls a light emitting portion enhancement processing for enhancing display luminance of a light emitting portion of the input video signal by increasing luminance of the light source by stretching the luminance based on the input video signal, detecting a light emitting portion regarded as a light emitting video based on a predetermined feature amount relating to brightness of the input video signal, and reducing luminance of a video signal of a non-light emitting portion except the light emitting portion of the input video signal, and switches the control of the light emitting portion enhancement processing according to a result of the detection by the display instruction detecting portion, and wherein
the control portion calculates a score indicating a degree of brightness by counting number of pixels with weighting brightness of each pixel for a video in a predetermined range including an area of the detected light emitting portion, and stretches the luminance of the light source according to the score.

9. The video display device as defined in claim 8, wherein when issuance is detected of an instruction to display the second input video signal together with the first input video signal, the control portion discontinues the light emitting portion enhancement processing.

10. The video display device as defined in claim 8, wherein when issuance is detected of an instruction to display the second input video signal together with the first input video signal, the control portion executes the light emitting portion enhancement processing for the first input video signal based on a setting of a first control property and executes the light emitting portion enhancement processing for the second input video signal based on a setting of a second control property.

11. The video display device as defined in claim 10, further comprising
a genre detecting portion that detects a first video genre of the first input video signal and a second video genre of the second input video signal, wherein
the setting of the first control property is determined based on the first video genre and the setting of the second control property is determined based on the second video genre.

12. The video display device as defined in claim 8, wherein the control portion produces a histogram by integrating number of pixels for the predetermined feature amount, and when representing an average value of the histogram as "A" and the standard deviation thereof as "σ", the control portion detects $$thresh = A + N\sigma (N \text{ is a constant})$$

or more pixels to be the light emitting portion.

13. The video display device as defined in claim 8, wherein the control portion reduces an amount of increase of the display luminance of the displaying portion by the luminance stretching of the light source in the non-light emitting portion by reducing the luminance of the input video signal.

14. A television receiving device comprising the video display device as defined in claim 8.

* * * * *